US012788184B2

(12) United States Patent
Hawkins

(10) Patent No.: US 12,788,184 B2
(45) **Date of Patent: *Nov. 10, 2026**

(54) HERBAL INFUSION AND DECARBOXYLATION DEVICE

(71) Applicant: Jeffrey Clayton Hawkins, Liberty, MO (US)

(72) Inventor: Jeffrey Clayton Hawkins, Liberty, MO (US)

( * ) Notice: Subject to any disclaimer, the term of this patent is extended or adjusted under 35 U.S.C. 154(b) by 737 days.

This patent is subject to a terminal disclaimer.

(21) Appl. No.: 18/329,967

(22) Filed: Jun. 6, 2023

(65) Prior Publication Data

US 2023/0309751 A1 Oct. 5, 2023

Related U.S. Application Data

(63) Continuation-in-part of application No. 17/934,919, filed on Sep. 23, 2022, now Pat. No. 12,396,467, (Continued)

(51) Int. Cl.
*A47J 43/046* (2006.01)
*A47J 31/44* (2006.01)
(Continued)

(52) U.S. Cl.
CPC ......... *A47J 43/046* (2013.01); *A47J 31/4407* (2013.01); *A47J 31/441* (2013.01); *A47J 43/0722* (2013.01); *A47J 43/085* (2013.01)

(58) Field of Classification Search
CPC ...... A47J 31/41; A47J 43/046; A47J 31/4407; A47J 31/441; A47J 43/044; A47J 43/0722;
(Continued)

(56) References Cited

U.S. PATENT DOCUMENTS

| | | |
|---|---|---|
| 4,226,175 A | 10/1980 | Sandor |
| 10,039,413 B1 | 8/2018 | Bellman |

(Continued)

FOREIGN PATENT DOCUMENTS

| | | | |
|---|---|---|---|
| CN | 105686666 | 6/2016 | |
| DE | 202010006484 U1 * | 9/2010 | ............ A47J 36/064 |
| EP | 2218375 A2 | 6/2016 | |

OTHER PUBLICATIONS

Ninja HB152 Foodi Heat-iQ Blender, Retrieved from Amazon, Retrieved on Jul. 12, 2022 <URL: https://www.amazon.com/Ninja-Blender-Smoothies-Nonstick-HB152/dp/B07S65293D>.

*Primary Examiner* — John J Norton
*Assistant Examiner* — Dilnessa B Belay

(57) ABSTRACT

An herbal infusion and decarboxylation device is an apparatus that enables higher control over an infusion process to make a high-quality infused product. The apparatus includes an infusion chamber, an infusion mechanism, and lid accessories. The infusion chamber enables the monitoring of the infusion process by including a chamber body and a lid assembly. The chamber body enables the visual monitoring of the infusion process. The lid assembly enables the attachment of the lid accessories. The infusion mechanism includes a mixing mechanism and a heating mechanism. The mixing mechanism enables a better blending of the infusion materials to generate a higher quality infusion. The heating mechanism enables the controlled heating of the infusion materials in the chamber body. The heating mechanism also enables the monitoring of the temperature of the infusion materials. The lid accessories enable the production of a wider range of infused products by altering the infusion process.

19 Claims, 23 Drawing Sheets

Related U.S. Application Data which is a continuation-in-part of application No. 29/825,929, filed on Feb. 7, 2022, now Pat. No. Des. 980,003, which is a continuation-in-part of application No. 29/724,484, filed on Feb. 14, 2020, now Pat. No. Des. 974,101.

(60) Provisional application No. 63/250,091, filed on Sep. 29, 2021.

(51) Int. Cl.
*A47J 43/07* (2006.01)
*A47J 43/08* (2006.01)

(58) Field of Classification Search
CPC .... A47J 27/004; A47J 27/21133; A47J 31/18; A47J 31/20
See application file for complete search history.

(56) References Cited

U.S. PATENT DOCUMENTS

| | | | | |
|---|---|---|---|---|
| D882,338 | S | 4/2020 | Bellman | |
| 10,758,078 | B2 | 9/2020 | Bellman | |
| 2005/0057876 | A1 | 3/2005 | Kim | |
| 2021/0022557 | A1* | 1/2021 | Atinaja | A23L 21/10 |

* cited by examiner

HERBAL INFUSION AND DECARBOXYLATION DEVICE

The current application is a continuation-in-part (CIP) application of the U.S. non-provisional application Ser. No. 17/934,919 filed on Sep. 23, 2022. The U.S. non-provisional application Ser. No. 17/934,919 is a CIP application of the U.S. design application Ser. No. 29/825,929 filed on Feb. 7, 2022. The U.S. design application Ser. No. 29/825,929 is a CIP application of the U.S. design application Ser. No. 29/724,484 filed on Feb. 14, 2020.

The U.S. non-provisional application Ser. No. 17/934,919 also claims a priority to a U.S. provisional application Ser. No. 63/250,091 filed on Sep. 29, 2021.

FIELD OF THE INVENTION

The present invention relates generally to herbal infusion methods and mechanisms. More specifically, the present invention is a novel herbal infusion and decarboxylation device that provides the user with manual and automatic means to control the herbal infusion process more efficiently and accurately.

BACKGROUND OF THE INVENTION

Herbal infusion into butters and oils derived from plants and animals can be a complicated process that requires the use of different tools to achieve the desired infusion level on the target product. To avoid the possible complications, many individuals use infusion devices (infusers) to infuse different herbs and seasonings into different products including, but not limited to, butters, oils, and materials used to create infused tinctures. Most prior infusers are designed to perform the infusion process with predetermined time and temperature settings set at the manufacturing facility or come with specific instructions on the herbal to oil/butter ratios for the infusion process. Further, many infusers lack the means to accommodate the wide range of variables or conditions the different infusion materials require for the most efficient herbal infusion. For example, the amount of heat, time, and emulsion rates needed to correctly infuse the infusion materials vary based on the amounts and type of infusion materials used.

Most prior infusers also instruct users to abide by the manufacturers set herbal to oil ratios outlined in the user's manuals. When the user wants to infuse different ratios outside of what is recommended in the user's manual, the user is required to check on the state of the infusion materials within the infuser periodically during the infusion process. If the user does not have the ability to visually determine the condition of the infused materials or the infuser does not allow for visual inspection of the infusion materials with liquid measuring marks, then the user cannot efficiently control, measure, or monitor the infusion process based on the physical appearance of the infused materials. For example, making alcohol infused tinctures in prior infusers can be hard as the alcohol evaporates and reduces the liquid levels within the infuser. As the alcohol level lowers from evaporation, the tincture becomes more concentrated, and the user needs the ability to visually measure and inspect this process to ensure the correct thickness of the tincture is achieved.

Furthermore, many prior infusers are designed with a motor located on the infuser lid. This design prevents the user from checking the state of the infused materials within the infusion chamber during the infusion and decarboxylation process as removing the lid requires the motor to be turned off. This can result in the timer being reset and the infuser having to be reheated. Additionally, the lid/motor design can be inconvenient as once the lid is removed, the blades of the motor prevent the lid from being safely placed on a flat surface. Further, if the infuser has just been used, the user can make a mess due to the blades being covered with the infusion materials. Setting down the lid/motor on a surface during inspection can also potentially contaminate the infusion materials with unwanted substances. In addition, the blades of prior infusers do not reach the bottom portions of the infusion chamber, which can result in heavy herbal materials becoming stagnated due to gravity and the lack of pulling/pushing force of the top suspended blade. Extremely heavy or super-thick herbal materials can potentially become stuck on the outer bottom edges of the heating element while the less heavy oils or butters are recycled in the top portions near the blade.

Furthermore, other infuser designs feature a slow-spinning magnetic mixer in the bottom of the chamber that needs a pod within the chamber to separate the herbs from the mixer. This design creates infusions that are less green and reduces the herbal taste within the infusion. However, this design also restricts the user's ability to make infusions with heavy green textures featuring strong herbal tastes like with prior infusers. Many infusion enthusiasts want more control over the infusion process to have a wider range of infusion capabilities. For example, some enthusiasts like less herbal taste with low green appearance while some prefer a thicker green consistency with heavier herbal taste. Further, there are many types of foods that can be created with the infused oils and butters. The type of food the user is preparing would also be a factor in the level of herbal taste needed to be achieved. Some food tastes can complement the heavy herbal taste and create great tasting infused meals, while other foods would almost require clean appearing butters or oils with very low herbal tastes. In addition, most prior infusers do not integrate a detachable translucent chamber that contains at least one heating element, at least one temperature control sensor, and a blade combination within the bottom inside portion of the chamber. This can cause and/or increase potential problems associated with infusions including, but not limited to, inefficient heating due to poor heat exchange, inaccurate temperature readings due to the poor heat exchange, or mixers not capable of thoroughly mixing and blending herbal materials.

Other devices known to infuse herbal materials such as hot/cold blenders are designed to incorporate features not commonly used for infusing butters or oils such as blades designed to crush ice. Most hot/cold food blenders heat the chambers contents based solely on predetermined time and temperature settings. Infusing mixtures that contain different herbal to material ratios require different time and temperature settings. However, no current hot/cold food blender can provide the means necessary for the proper decarboxylation of herbal materials and or the infusion of herbal materials into butters and oils by allowing for greater control over the infusion and decarboxylation process by the user.

Therefore, an objective of the present invention is to provide an herbal infusion and decarboxylation device with a uniquely designed infusion chamber that has better heat exchange, enables more accurate temperate readings, provides greater mixing and emulsion rates, and increases the overall infuser abilities such as a wider range of possible infusion consistencies. Another objective of the present invention is to provide a uniquely designed lid assembly capable of supporting various infusion attachments that improve the user's ability to produce a wider range of infusion consistencies that increases the overall infused food possibilities. In addition, some infusion attachments help reduce unwanted problems associated with infusions including, but not limited to, odors caused from the decarboxylation and infusion process. Further, another objective of the present invention is to provide an herbal infusion and decarboxylation device that facilitates the infusion and decarboxylation of different herbal materials into butters and oils by improving the control the user has over all the variables of the decarboxylation and infusion process. The present invention enables the user to control the emulsion rates, the temperature, and times of the infusion and decarboxylation process as well as the ability to adjust the factory preset times and temperatures of all the manufacture preset functions. This ensures that the infusion and decarboxylation process is properly performed and that the infusion materials are properly decarboxylated and infused to the user's specifications.

Another objective of the present invention is to provide an herbal infusion and decarboxylation device that enables the user to properly monitor the infusion process with the use of a transparent chamber marked with liquid measuring marks. The present invention enables users to visually monitor the infused materials within the chamber to ensure no over exposure to heat is occurring while simultaneously allowing for the exact herbal to infusion material ratios to be measured while evaporation or reduction of the liquid material is occurring. Further, the present invention allows for the user to adjust the times and temperatures of the infusion materials based on the visual inspection of materials and liquid measurement marks. Furthermore, various electronic features help facilitate the automatic and visual monitoring of the different variables of the infusion process to further assist in reducing problems associated with infusions. This uniquely arranged design allows for other devices to be electrically connected to the infuser base to further assist users with the herbal infusion process such as, but not limited to, decarboxylating herbal grinders, herbal wax decarboxylation chambers and silicone lined heating chambers. Another objective of the present invention is to provide an herbal infusion and decarboxylation device that facilitates the safe handling of the infused product after the infusion process as well as the maintenance of the present invention. Additional features and benefits of the present invention are further discussed in the sections below.

SUMMARY OF THE INVENTION

The present invention provides an herbal infusion and decarboxylation device that facilitates the decarboxylation and infusion of different herbal materials into butters and oils in an efficient and more controlled manner. The present invention provides users with the ability to visually monitor and measure the concentration levels of the infusion materials during operation to ensure and maintain more precise infusions. The present invention also provides users with the ability to produce a wider range of finished infused material consistencies to further increase the overall infused food possibilities. Further, the present invention provides users with a uniquely arranged set of components to reduce problems associated with infusions including, but not limited to, infusion odors, low heat exchange, and limited emulsion rates.

Further, the present invention provides an infusion device that increases the overall ability to control the wide range of infusion and decarboxylation variables during the infusion and decarboxylation process. The present invention includes an infusion and decarboxylation chamber designed to facilitate the visual monitoring and measuring of the infusion and decarboxylation process by the user. The infusion chamber also facilitates the handling of the infusion materials before, during, and after the infusion process to protect the infusion materials as well as to protect the user. Further, the infusion chamber is designed to house various elements in the interior bottom of the chamber that are necessary for the infusion process including, but not limited to, a set of blades, a heating plate, as well as means to monitor the interior operation of the different elements. Further, the infusion chamber is equipped with a lid assembly that accommodates different accessories to facilitate the infusion process including, but not limited to, a blade reduction screen, an odor control cartridge receptacle, and a mesh strainer. Furthermore, the present invention includes an infusion mechanism that enables the user to control the operation of the infusion mechanism based on the current conditions of the infusion materials during the infusion process.

The present invention enables the user to control different variables including, but not limited to, the herbal emulsion rates, the infusion timing, as well as the heating of the infusion materials during the infusion process to accommodate the infusion material's infusion requirements. The monitoring and measuring of the decarboxylation and infusion process can be automatic based on the user's preset preferences or can be directly configured by the user before or during the infusion and decarboxylation process. The present invention ensures that the infusion settings are maintained during the infusion process in order to achieve a properly infused product that meets user's wide range of infusion criteria.

DETAIL DESCRIPTIONS OF THE INVENTION

Figure 1:
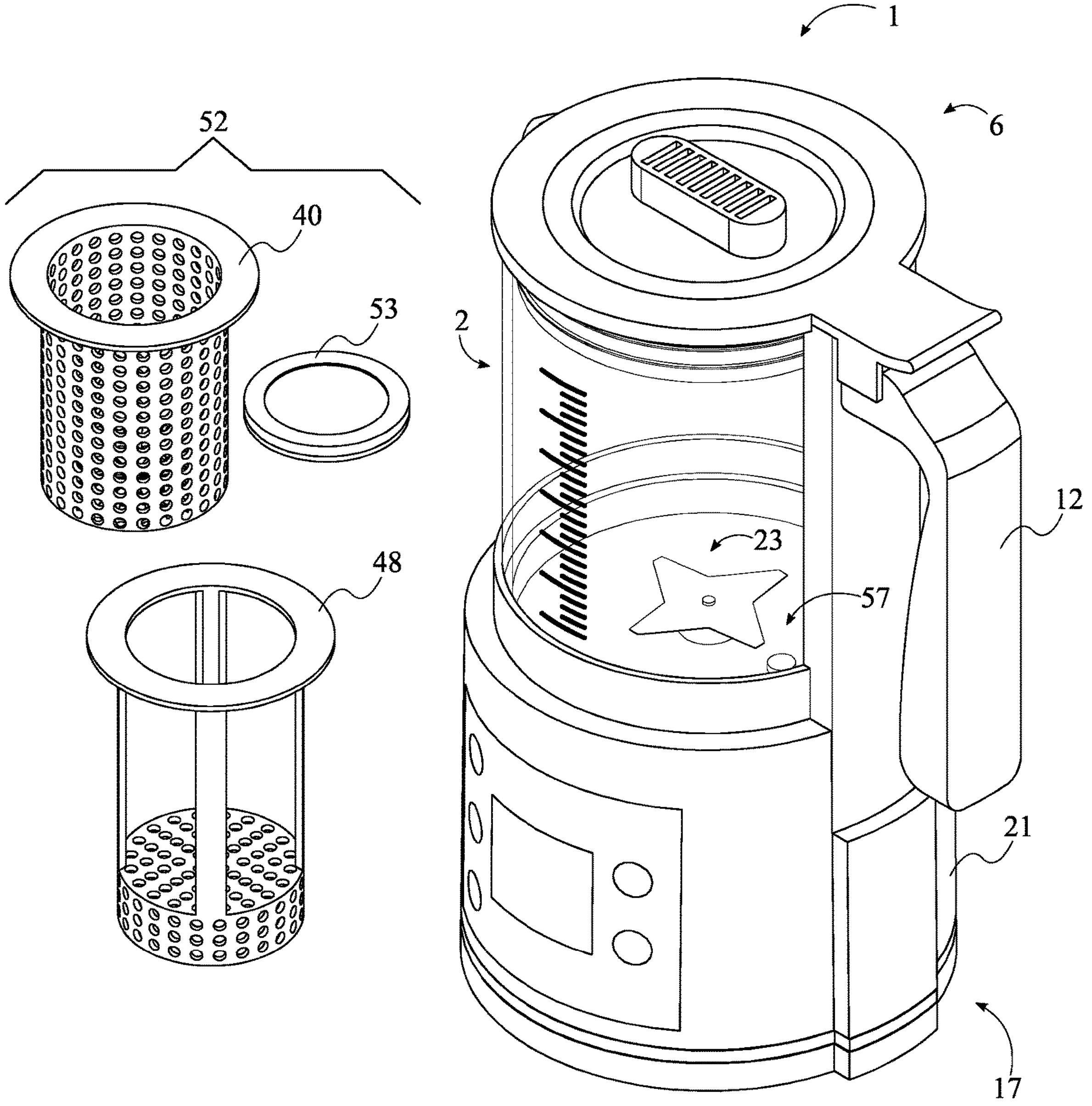
FIG. 1 is a top-front exploded perspective view of the present invention, wherein a plurality of lid accessories of the present invention is shown.
Figure 2:
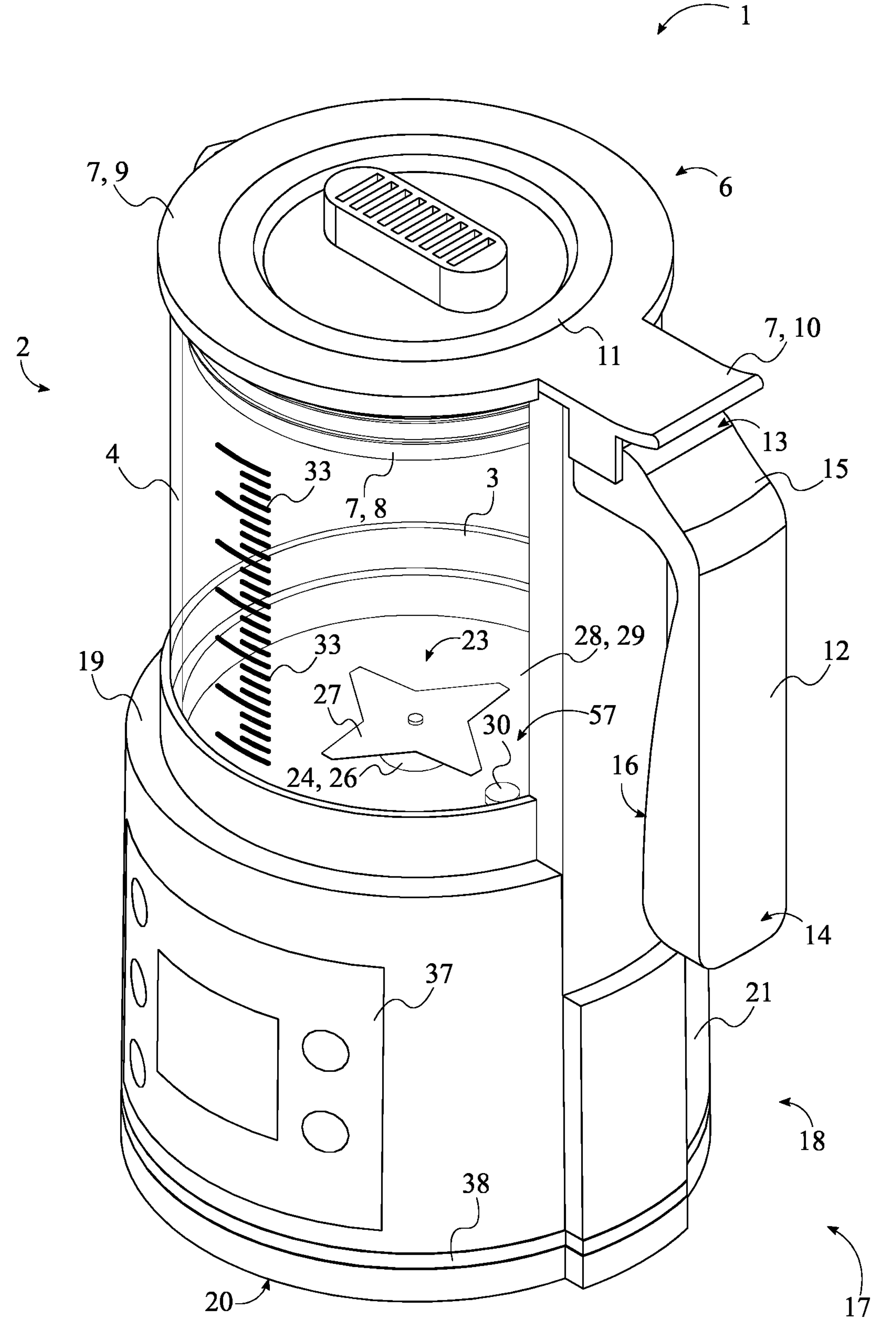
FIG. 2 is a top-front perspective view of the present invention.
Figure 3:
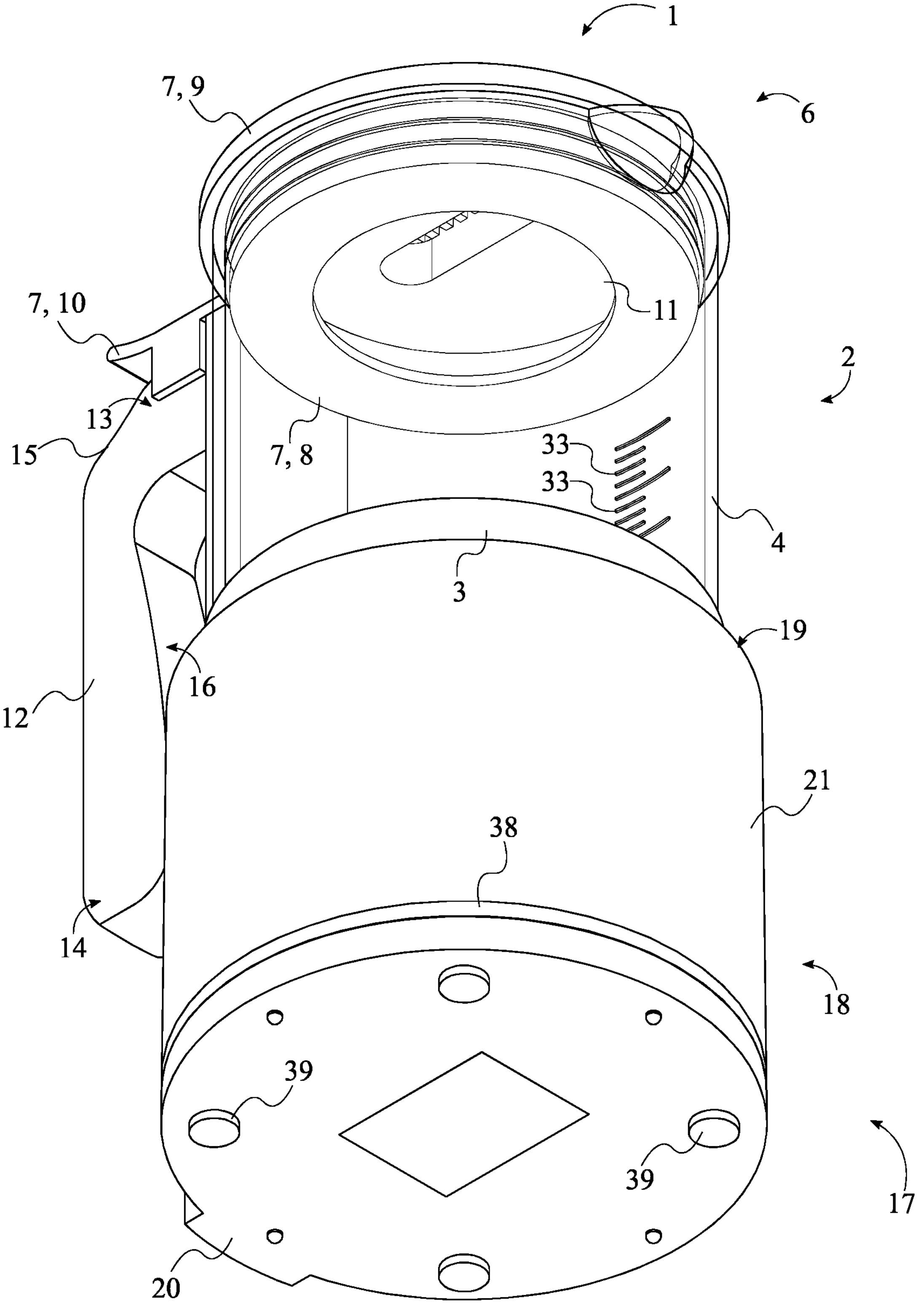
FIG. 3 is a bottom-rear perspective view of the present invention.
Figure 4:
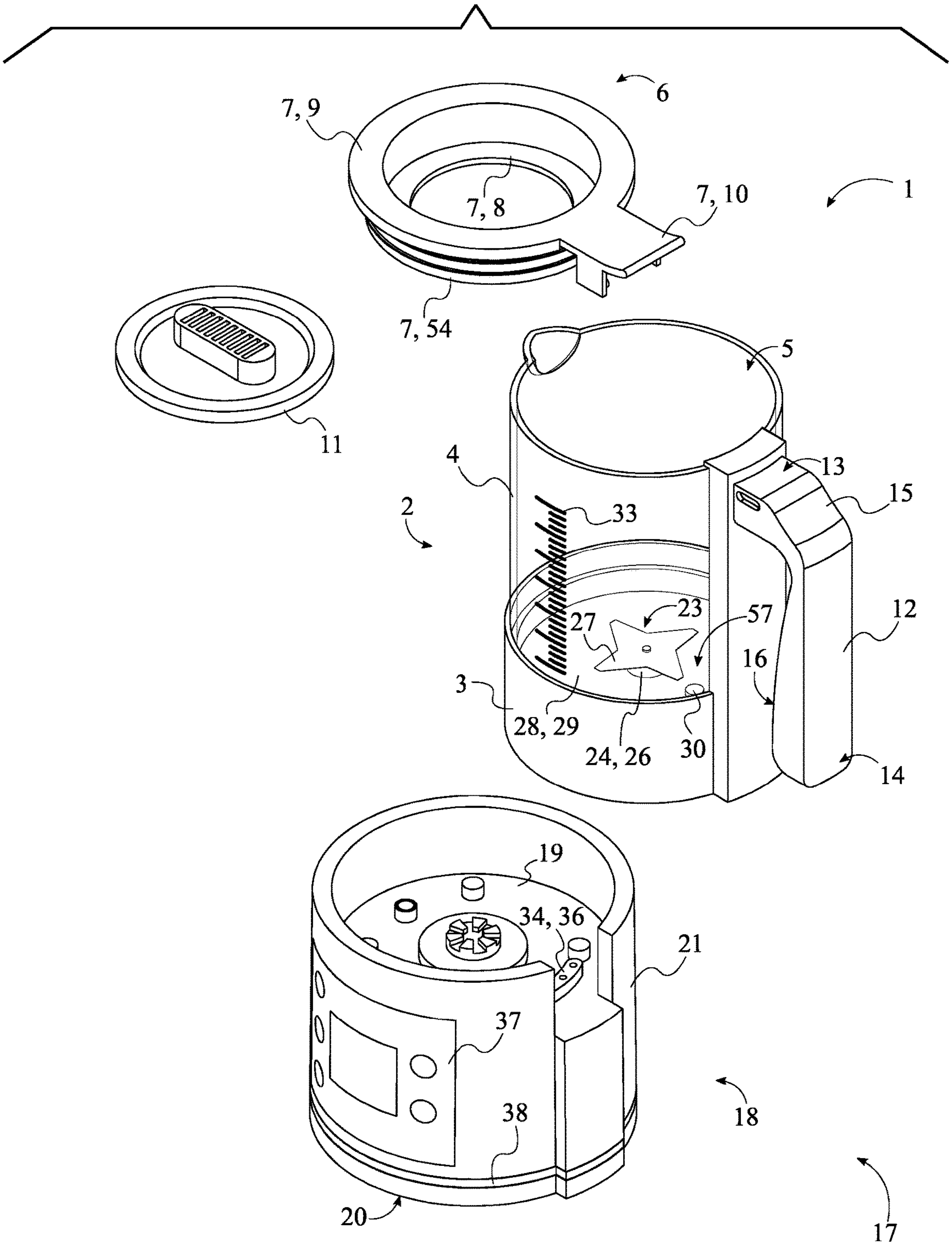
FIG. 4 is a top-front exploded perspective view of the present invention.
Figure 5:
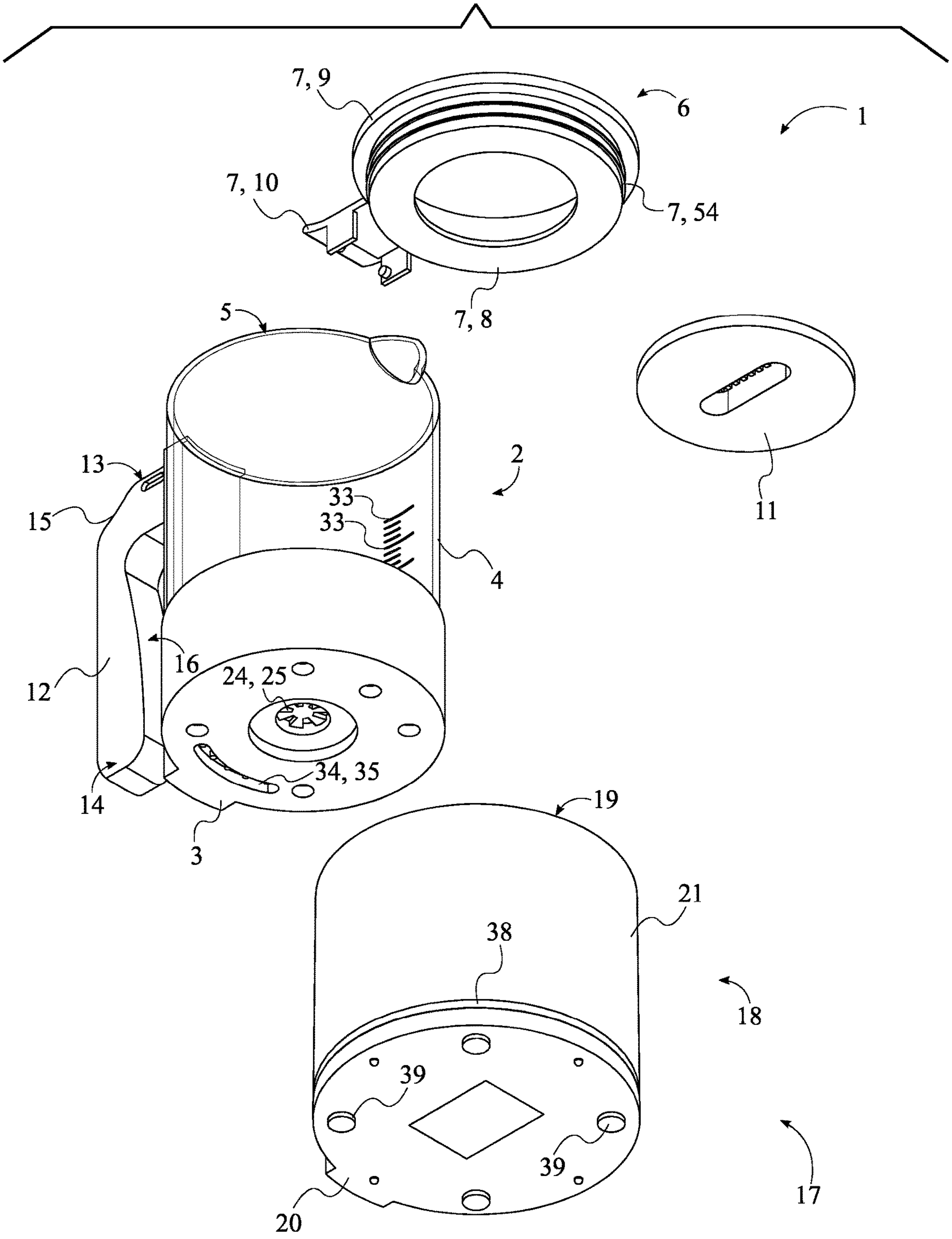
FIG. 5 is a bottom-rear exploded perspective view of the present invention.
Figure 6:
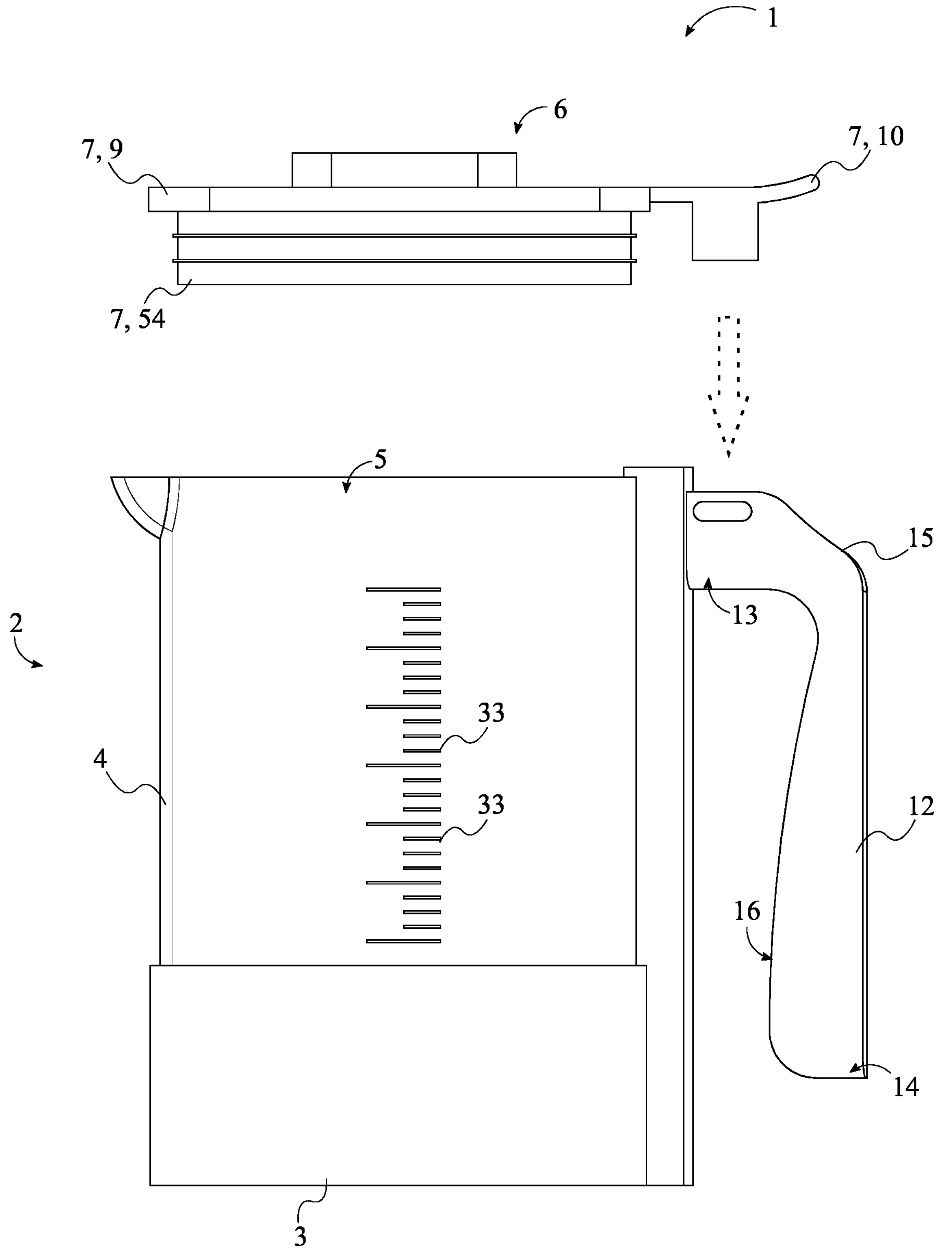
FIG. 6 is a front exploded view of the infusion chamber of the present invention, wherein the lid assembly is shown removed using the thumb tab.
Figure 7:
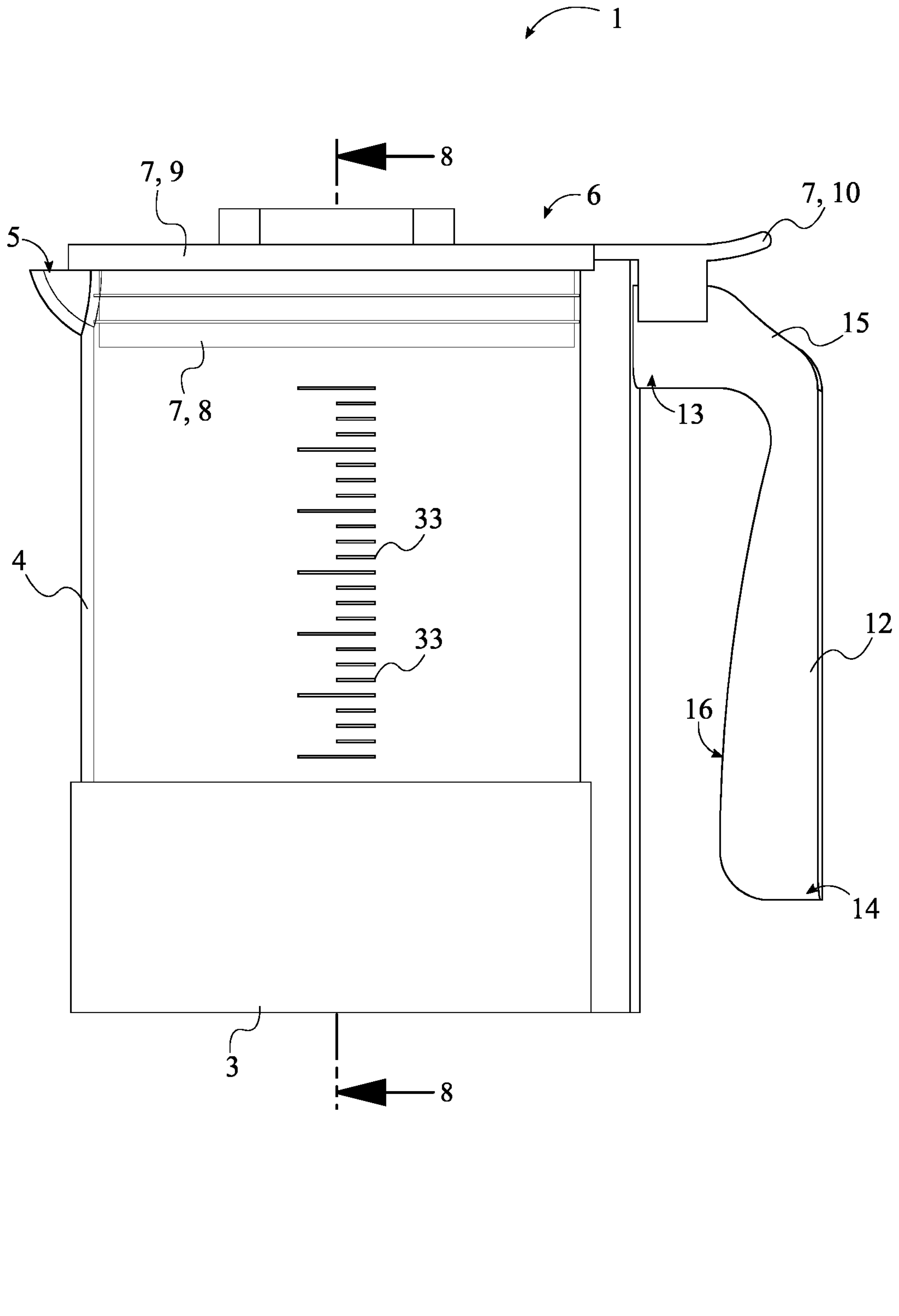
FIG. 7 is a front view of the infusion chamber of the present invention.
Figure 8:
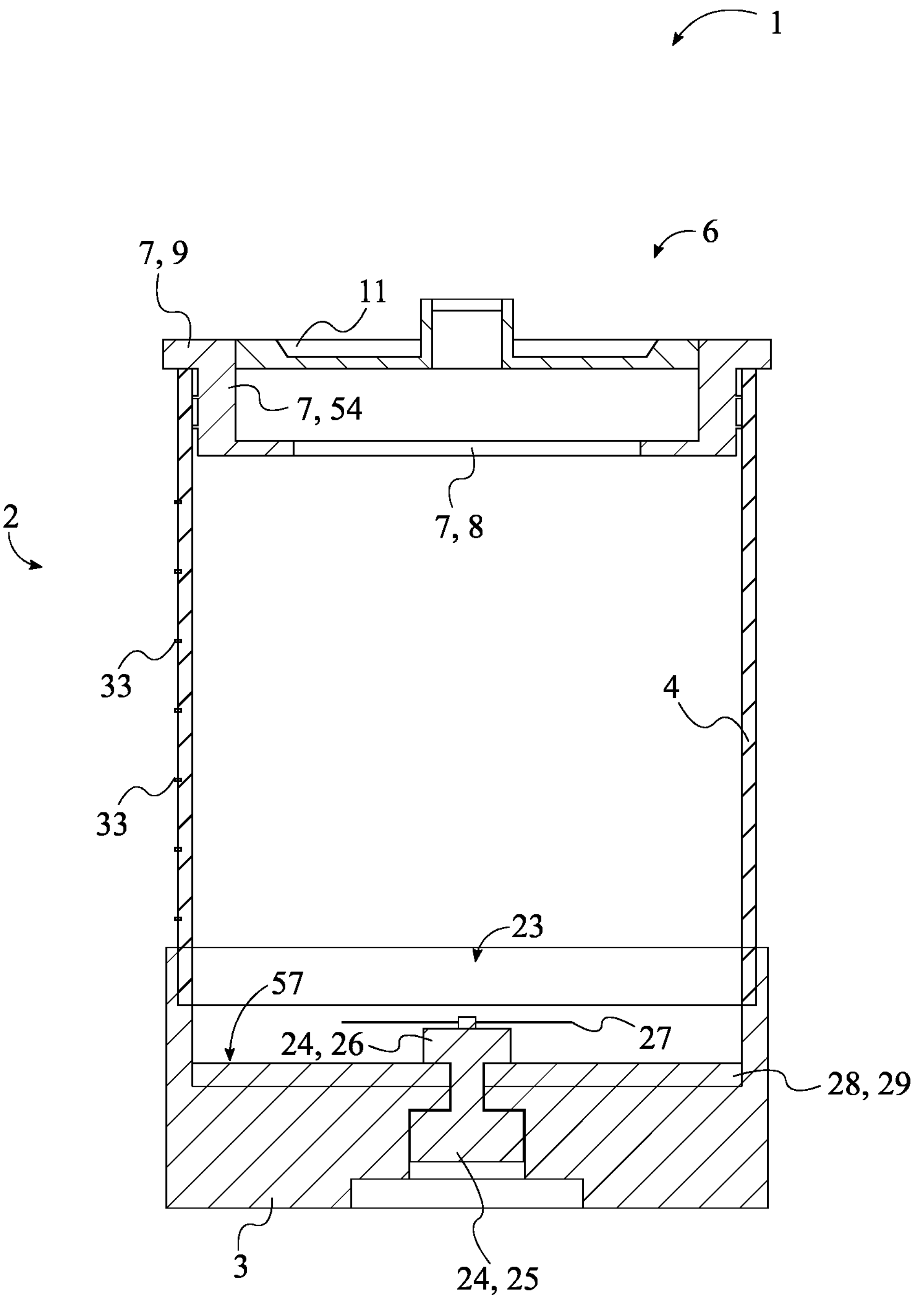
FIG. 8 is a vertical cross-sectional view taken along line 8-8 in FIG. 7.
Figure 9:
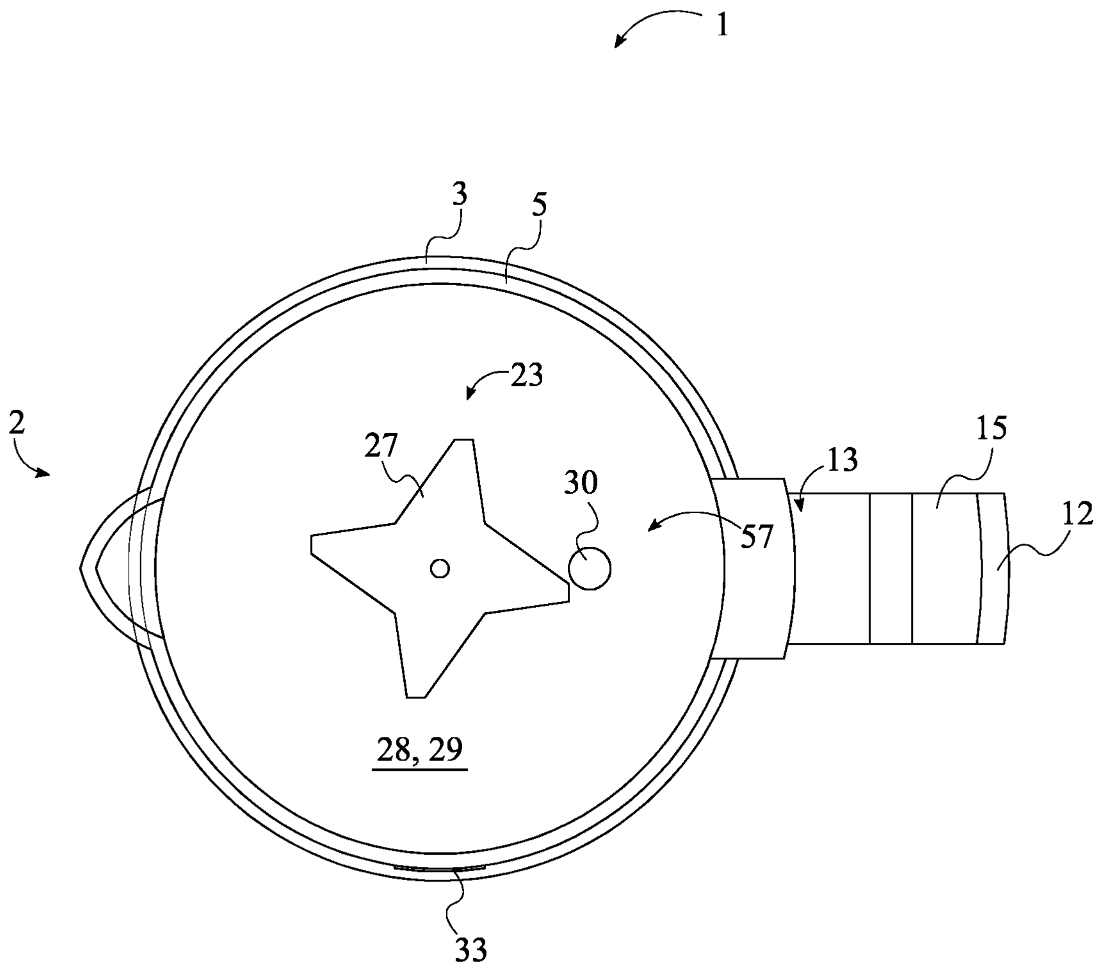
FIG. 9 is a top view of the infusion chamber of the present invention, wherein the lid assembly of the present invention is shown removed.
Figure 10:
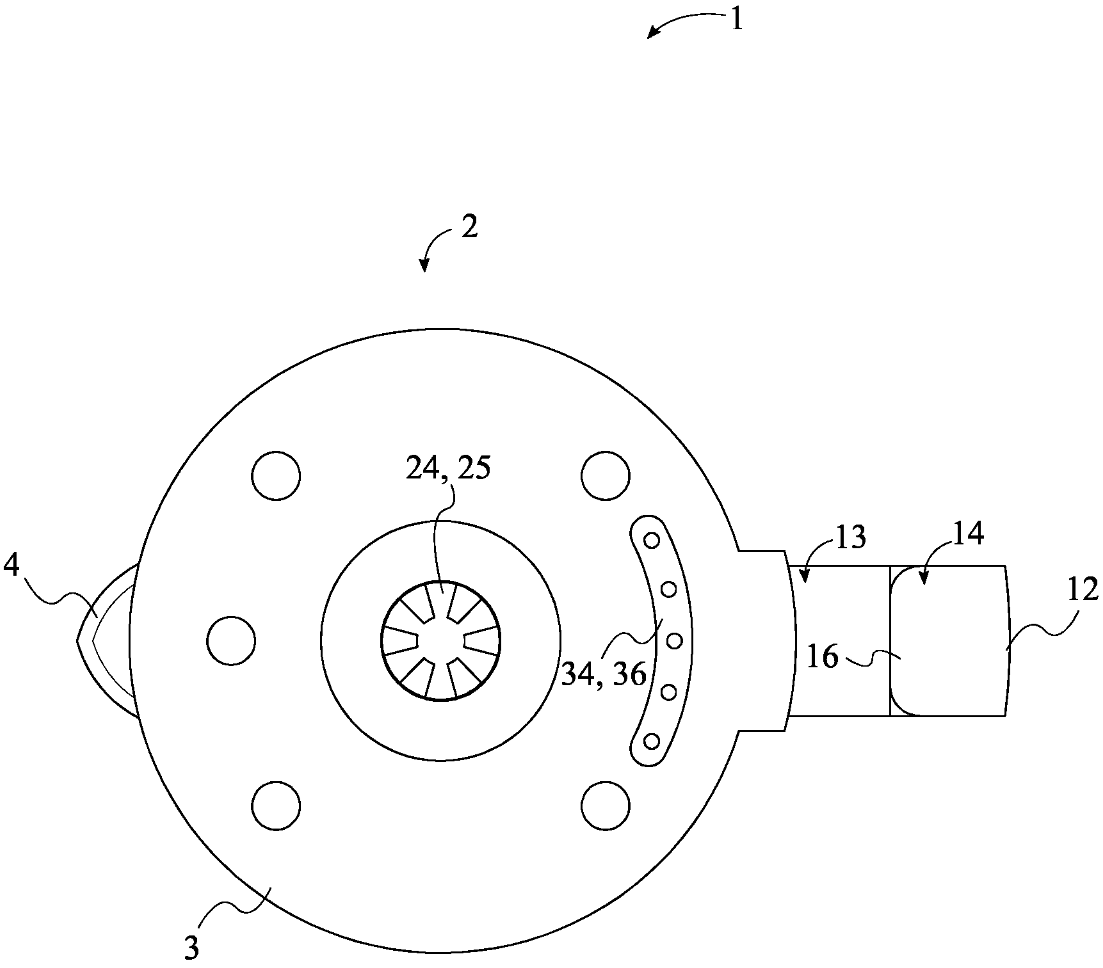
FIG. 10 is a bottom view of the infusion chamber of the present invention, wherein the lid assembly of the present invention is shown removed.

All illustrations of the drawings are for the purpose of describing selected versions of the present invention and are not intended to limit the scope of the present invention.

The present invention is an herbal infusion and decarboxylation device that enables the user to have more control over the infusion process of different infusion materials to make a high-quality product. The present invention enables the herbal infusion of different products including, but not limited to, butters, oils, and other materials used to make infused tinctures. As can be seen in FIGS. 1 through 5 and 23, the present invention comprises an infusion chamber 1, an infusion mechanism 17, a controller 31, a power source 32, and a plurality of lid accessories 52. The infusion chamber 1 serves to retain the different infusion materials during the infusion process in such a way that the user can monitor and measure the conditions of the infusion materials during the infusion process. The infusion mechanism 17 enables the user to control the infusion process more accurately to produce an infused product of higher quality. The controller 31 enables the automatic and/or manual control of different variables of the infusion process. The power source 32 provides the voltage necessary for the operation of the infusion mechanism 17 and the controller 31. The plurality of lid accessories 52 includes various accessories that facilitate the control of the infusion process, such as controlling the concentration of the infused materials. The plurality of lid accessories 52 also includes various accessories that improve the infusion process, such as reducing the odors generated during the infusion process.

The general configuration of the aforementioned components enables the user to efficiently make different infused products by having more control over the infusion materials during the infusion process. As can be seen in FIGS. 1 through 5 and 23, the infusion chamber 1 is designed to enable the user to visually monitor and measure the infusion process while facilitating the handling of the infusion materials before, during, and after the infusion process. To do so, the infusion chamber 1 comprises a chamber body 2 and a lid assembly 6. The chamber body 2 is a transparent and hollow body large enough to retain an amount of infusion materials. The lid assembly 6 is designed to facilitate the infusion process by utilizing various attachments as well as contain the infused materials. Further, the plurality of lid accessories 52 comprises an odor controlling assembly 53. The odor controlling assembly 53 helps trap the odors generated during the infusion process. Further, the infusion mechanism 17 comprises a housing 18, a heating mechanism 57, and a mixing mechanism 23. The housing 18 serves to protect the electrical and electronic components of the present invention. The housing 18 also serves as a base support for the infusion chamber 1. In addition, the heating mechanism 57 and the mixing mechanism 23 enable the controlled heating of the infusion materials to make the desired infused product. The heating mechanism 57 also enables the monitoring of the temperature of the interior of the chamber body 2 to control the infusion process during the infusion process if necessary.

The overall assembly of the present invention forms a compact structure that is easy to operate and easy to use. As can be seen in FIGS. 1 through 5 and 23, to assemble the present invention, the chamber body 2 is mounted onto the housing 18 so that the infusion chamber 1 can be coupled to the heating mechanism 57 and the infusion mechanism 17. The lid assembly 6 is mounted onto the chamber body 2, opposite to the housing 18, to seal the chamber body 2 during the infusion process. The lid assembly 6 also enables different accessories to be secured to the chamber body 2 that can be used with the infusion chamber 1. Further, at least one selected accessory from the plurality of lid accessories 52 is operatively integrated into the lid assembly 6. The at least one selected accessory is used to provide a supplemental functionality to the lid assembly 6. For example, when the odor controlling assembly 53 is inserted into the lid assembly 6, the odors from the infusion process are trapped by the odor controlling assembly 53. The blade reduction screen 48 can be inserted into the lid assembly 6 along with the odor controlling assembly 53, or individually, to help control the concentration of the different infusion materials. The mesh strainer 40 can be inserted into the lid assembly 6 after the infusion process to facilitate the removal of undesired infusion materials from the final infusion product. Further, the mixing mechanism 23 is operatively integrated into the chamber body 2 to expose the infusion materials within the chamber body 2 to the mixing mechanism 23. This way, the mixing mechanism 23 can be used to blend contents of the chamber body 2 during the infusion process. In addition, the heating mechanism 57 is in thermal communication with the chamber body 2 to heat up the infusion materials in the chamber body 2 during the infusion process. Furthermore, the mixing mechanism 23 and the heating mechanism 57 are electronically connected to the controller 31 to enable the automatic operation of the heating mechanism 57 and the mixing mechanism 23 according to the user preferences. The mixing mechanism 23, the heating mechanism 57, and the controller 31 are also electrically connected to the power source 32 to each receive the power necessary for operation.

As previously discussed, the infusion chamber 1 is designed to retain different amounts of infusion materials that are used to make a desired infused product. As can be seen in FIGS. 6 through 10, the chamber body 2 is designed to safely retain the infusion materials during the infusion process. The chamber body 2 may comprise a chamber base 3, a chamber lateral wall 4, and a chamber opening 5. The chamber body 2 is preferably a cylindrical hollow structure with an open base through which infusion materials can be inserted. The chamber base 3 preferably corresponds to the closed base of the chamber body 2, while the chamber opening 5 corresponds to the open base. Accordingly, the chamber base 3 is positioned opposite to the chamber opening 5 about the chamber lateral wall 4 due to the cylindrical structure of the chamber body 2. The chamber base 3 is positioned coextensive with the housing 18. The chamber base 3 is also mounted onto the housing 18. This way, the chamber body 2 sits perfectly on top of the housing 18 during the infusion process to prevent operational failures. In addition, the lid assembly 6 is mounted across the chamber opening 5 to seal the chamber body 2 during the infusion process. In some embodiments, the chamber body 2 may include a spout positioned adjacent to the chamber opening 5 to facilitate the pouring of the infused products after the infusion process.

In some embodiments, the mixing mechanism 23 is mounted within the chamber body 2 so that the mixing mechanism 23 mixes and lightly emulsifies the infusion materials for the making of the infused product. As can be seen in FIGS. 1 through 5 and 23, the mixing mechanism 23 may comprise a blade hub 24, at least one blade 27, and a motor 22. The blade hub 24 serves to connect the at least one blade 27 to the motor 22. The at least one blade 27 serves to lightly emulsify and mix the infusion materials in the chamber body 2. The at least one blade 27 is designed to have one or more dull, rounded, pitched blades that reduce the cutting action while thoroughly mixing materials within the chamber body 2. The pitched blade helps push the infusion materials down and outwards towards the heating mechanism 57. This way, the infusion materials that are stagnating at the bottom of the chamber body 2 are effectively displaced across the heating mechanism 57 to heat all infusion materials more evenly. The blade hub 24 is preferably a short cylindrical structure that fits in the chamber base 3 to enable the rotation of the at least one blade 27 by the motor 22. The at least one blade 27 is designed to thoroughly mix and lightly emulsify the infusion materials to make a perfectly infused product. The at least one blade 27 is preferably a low emulsion pitched blade, but other types of blades or mixers can be used if necessary. The low emulsion blade is designed to lightly emulsify the infusion materials throughout the chamber body 2. Further, the heating mechanism 57 may comprise at least one heating plate 28 and at least one temperature sensor 30. The at least one heating plate 28 enables the controlled heating of the infusion materials retained within the infusion chamber 1 during the infusion process. The at least one temperature sensor 30 helps monitor the temperature of the interior of the chamber body 2 to adjust the heating of the at least one heating plate 28. This way, the infusion materials are heated to a predetermined temperature set by the user.

As can be seen in FIGS. 1 through 5 and 23, the blade hub 24 comprises a first hub end 25 and a second hub end 26. The blade hub 24 centrally traverses through the chamber base 3 and the at least one heating plate 28 to transmit the torque from the motor 22 to the at least one blade 27. Further, the first hub end 25 is rotatably connected to the chamber base 3 while the second hub end 26 is rotatably connected to the at least one heating plate 28. This way, the blade hub 24 can freely rotate on the chamber base 3 without leaving any gap on the chamber base 3 through which the infusion materials can leak. The at least one heating plate 28 and the at least one temperature sensor 30 are mounted within the chamber body 2, adjacent to the housing 18. This ensures that the at least one heating plate 28 and the at least one temperature sensor 30 are in contact with the infusion materials during the infusion process. The at least one temperature sensor 30 is also in thermal communication with the chamber body 2 to monitor the temperature within the chamber body 2 during the infusion process. This way, an accurate temperature of the interior of the chamber body 2 and the infusion materials can be monitored in real-time. On the other hand, the motor 22 and the controller 31 are mounted within the housing 18 so that the motor 22 and the controller 31 are not exposed to the surroundings. Further, to connect the motor 22 to the at least one blade 27, the motor 22 is operatively coupled to the first hub end 25 so that the motor 22 can be used to rotationally drive the first hub end 25. The motor 22 can be coupled to the first hub end 25 in different ways, such as including a shaft that terminally connects to the first hub end 25 in such a way that the torque generated by the motor 22 is transferred to first hub end 25 by the shaft. The at least one blade 27 is also torsionally connected to the second hub end 26 to secure the at least one blade 27 to the blade hub 24. Further, to enable the automatic operation of the different electronic components, the motor 22, the at least one heating plate 28, and the at least one temperature sensor 30 are electronically connected to the controller 31. This enables the transmission of operational signals from the controller 31 to the electronic components so that the motor 22, the at least one heating plate 28, and the at least one temperature sensor 30 operate under predetermined operational settings set by the user. Further, the motor 22 and the at least one heating plate 28 are electrically connected to the power source 32 so that both the motor 22 and the at least one heating plate 28 receive the voltage necessary for operation. In some embodiments, the controller 31 can adjust the heating of the at least one heating plate 28 automatically if the temperature of the interior of the chamber body 2 does not meet a predetermined temperature. Alternatively, the user can adjust the heating of the at least one heating plate 28 based on the readings from the at least one temperature sensor 30 to increase the quality of the desired infusion product.

As can be seen in FIGS. 1 through 10, the at least one heating plate 28 is designed to properly heat the infusion materials to facilitate the infusion of the infusion materials in the chamber body 2. So, the at least one heating plate 28 may comprise an annular plate body 29 that fully covers the interior of the chamber base 3. By covering the interior surface of the chamber base 3, the at least one heating plate 28 ensures that all the infusion materials are heated evenly inside the chamber body 2. Accordingly, the annular plate body 29 is positioned coextensive with the chamber base 3. The annular plate body 29 is also mounted onto the chamber base 3 to secure the annular plate body 29 to the chamber base 3. This way, the annular plate body 29 does not come loose during the infusion process or leaves any gaps through which infusion materials can leak. Further, the blade hub 24 is centrally positioned with the annular plate body 29 so that the blade hub 24 is not obstructed by the annular plate body 29.

To further facilitate the making of the infused product, the present invention may further comprise a plurality of markings 33 that correspond to various measurement markings provided on the chamber body 2, as can be seen in FIGS. 1 through 10. For example, the plurality of markings 33 can show different volume measurements in the chamber body 2. The chamber body 2 is also preferably made of a transparent material that is adequate for retaining hot materials including, but not limited to, tempered glass. The transparent chamber body 2 also enables the user to visually monitor the infusion process without having to remove the lid assembly 6. To integrate the plurality of markings 33 on the chamber body 2, the plurality of markings 33 is distributed along the chamber lateral wall 4. The distribution of the plurality of markings 33 preferably corresponds to incremental volumetric units of measurements or other markings that help the user produce infused products with more exact herbal to oil ratios. For example, the plurality of markings 33 can include milliliter (ml) and fluid ounce (fl. oz) measurement marks to allow visual confirmation of the amount of infusion materials within the chamber body 2. Further, the plurality of markings 33 is inscribed onto the chamber lateral wall 4 so that the plurality of markings 33 is not removed or damaged during the cleaning of the chamber body 2.

As can be seen in FIGS. 1 through 10 and 23, the infusion mechanism 17 includes components distributed throughout the chamber body 2 and the housing 18 that communicate during the infusion process to give the user more control over the infusion process. This requires the unobstructed communication between the heating plate and the controller 31 while facilitating the removable mounting of the chamber body 2 to the housing 18. The present invention may further comprise a pin connector 34 that enables the removable coupling between the at least one heating plate 28 and the controller 31. The pin connector 34 comprises a pin plug 35 and a pin socket 36 that enable the removable coupling of the chamber body 2 to housing 18 without exposing the user to dangers such as a strong electrical current. Accordingly, the pin plug 35 is integrated into the chamber body 2, adjacent to the housing 18, so that the pin plug 35 is secured to the chamber base 3. On the other hand, the pin socket 36 is integrated into the housing 18, adjacent to the pin plug 35. The pin socket 36 is integrated into the base of the housing 18 that receives the chamber body 2. In addition, the housing 18 may include a plurality of guides that ensure that the pin plug 35 aligns with the pin socket 36 when the chamber body 2 is mounted onto the housing 18. The plurality of guides facilitates the process of mounting the chamber body 2 to the housing 18 to prevent unproper coupling between the pin plug 35 and the pin socket 36. Once the chamber body 2 is mounted onto the housing 18 and the pin plug 35 couples with the pin socket 36, the at least one heating plate 28 is electrically connected to the power source 32 through the pin connector 34. The at least one heating plate 28 and the at least one temperature sensor 30 are also electronically connected to the controller 31 through the pin connector 34. In other embodiments, the pin connector 34 enables the attachment of different devices to the housing 18 such as an electric heating chamber with detachable silicone liners that helps user temper chocolate, warm up edibles, etc.

Further, the housing 18 preferably has a shape and size that matches the shape and size of the chamber body 2 to form an overall cylindrical structure that is aesthetically pleasing. As can be seen in FIGS. 1 through 10, the housing 18 preferably has an overall cylindrical shape. Accordingly, the housing 18 may comprise a first housing base 19, a second housing base 20, and a housing lateral wall 21. The first housing base 19 and the second housing base 20 preferably correspond to the flat bases of the cylindrical structure of the housing 18. So, the first housing base 19 is positioned opposite to the second housing base 20 about the housing lateral wall 21 due to the cylindrical shape of the housing 18. Further, the chamber body 2 is centrally mounted onto the first housing base 19, thus forming an overall cylindrical structure with the infusion chamber 1.

As can be seen in FIGS. 1 through 5 and 23, to enable the direct control of the operation of the present invention, the present invention may further comprise a user interface 37. The user interface 37 enables the user to configure the operational settings of the present invention, such as the rotational speed of the blade hub 24, the heating temperature of the at least one heating plate 28, the timing of the overall infusion process, etc. To do so, the user interface 37 is integrated into the housing lateral wall 21 so that the user interface 37 is accessible to the user. The user interface 37 is electronically connected to the controller 31 so that the user can input operational signals using the user interface 37. Further, the user interface 37 is electrically connected to the power source 32 to control the power being transmitted to the corresponding electrical components. For example, the user interface 37 can include a power button which the user can press to turn on and off the present invention. The controller 31 can be programmed to perform different functions which can be selected and activated on the user interface 37. For example, the present invention can include a decarboxylation setting that is preconfigured during the manufacturing process. The decarboxylation setting may involve heating the at least one heating plate 28 to degrees Fahrenheit for minutes. The user can adjust the timing and temperature of the decarboxylation process if necessary. Furthermore, additional settings can be provided for the infusion of different infusion products including, but not limited to, butters, oils, and tinctures. The present invention can also include settings that help with the maintenance of the present invention. For example, the user interface 37 can include a cleaning function to help with the cleaning of the chamber body 2. All settings can be modified by the user using the user interface 37.

Further, the present invention includes different means to indicate the user of the operation of the present invention. For example, the present invention can alert the user when the chamber body 2 is hot and dangerous to handle directly. As can be seen in FIGS. 1 through 5 and 23, the present invention may further comprise a heat-on visual indicator 38. The heat-on visual indicator 38 is designed to clearly show the user that the chamber body 2 is hot so that the user may use precautions when handling the chamber body 2 once the infusion process is completed. The heat-on visual indicator 38 is positioned around the housing lateral wall 21 to make the heat-on visual indicator 38 visible from all angles. The heat-on visual indicator 38 can include a Light-Emitting Diode (LED) backlit screen that surrounds the housing lateral wall 21. In addition, the heat-on visual indicator 38 is positioned adjacent to the second housing base 20 to not obstruct the view of the user interface 37. Further, the heat-on visual indicator 38 is integrated into the housing lateral wall 21 to secure the heat-on visual indicator 38 to the housing 18. The heat-on visual indicator 38 is also electronically connected to the controller 31 to receive operational signals from the controller 31. For example, when the at least one temperature sensor 30 detects a high temperature within the chamber body 2, the sensor signals are transmitted to the controller 31 which processes the sensor signals. If the controller 31 analyses that the sensor signals correspond to a high temperature in the chamber body 2, the controller 31 turns on the heat-on visual indicator 38 to indicate to the user that the chamber body 2 is hot. Furthermore, the heat-on visual indicator 38 is electrically connected to the power source 32 to receive the voltage necessary for the operation of the heat-on visual indicator 38. In other embodiments, other visual indicators can be provided on the chamber body 2 to indicate the different conditions of the chamber body 2.

Furthermore, the present invention may further comprise a plurality of legs 39 that protects the surface on which the present invention is placed on. As can be seen in FIGS. 1 through 5, the plurality of legs 39 can be made from different materials that prevent the slippage of the housing 18 while sitting on the surface, such as silicone or similar anti-slip materials that also protect the surface. Further, the plurality of legs 39 can be designed to limit the transmission of vibrations generated by the motor 22 to the surface on which the housing 18 is placed to reduce the noise generated during the infusion process. To do so, the plurality of legs 39 is distributed across the second housing base 20 to evenly distribute the weight of the housing 18 and the infusion chamber 1 on the plurality of legs 39. Furthermore, the plurality of legs 39 is mounted onto the second housing base 20, opposite the housing lateral wall 21, to secure the plurality of legs 39 to the housing 18. In other embodiments, the plurality of legs 39 can be replaced with a single layer of material like the material used on the plurality of legs 39 to protect the second housing base 20.

As previously discussed, the lid assembly 6 is designed to enable the user to attach different accessories to the chamber body 2 to facilitate the making of different infused products. As can be seen in FIGS. 1 through 10, the lid assembly 6 may further comprise a cover holder 7 and a removable cover 11. The cover holder 7 is designed to enable the attachment of the plurality of lid accessories 52 to the chamber body 2, while the removable cover 11 serves to seal the cover holder 7 as well as to firmly secure the plurality of lid accessories 52 into the correct position in the cover holder 7. Further, the cover holder 7 comprises a holder rim 8, a holder flange 9, and an annular insert 54. The annular insert 54 facilitates the hermetical attachment of the cover holder 7 to the chamber body 2. The holder flange 9 enables the attachment of the removable cover 11 to the cover holder 7 to fully seal the chamber body 2. The holder rim 8 enables the attachment of the different accessories to the cover holder 7. To attach the cover holder 7 to the chamber body 2, the annular insert 54, the holder flange 9, the holder rim 8, and the removable cover 11 are centrally positioned with each other so that the lid assembly 6 can fit in the circular chamber opening 5. The holder rim 8 and the holder flange 9 are positioned opposite to each other along the annular insert 54 to form an overall T-shaped structure. In addition, the holder rim 8 and the holder flange 9 are connected perpendicularly to the annular insert 54 to form a single structure. In addition, the annular insert 54 is hermetically attached into the chamber opening 5. This way, the cover holder 7 is secured to the chamber body 2 while preventing any fluid from exiting the chamber body 2 during the infusion process. Furthermore, the removable cover 11 is hermetically attached onto the holder flange 9 to seal the center of the cover holder 7 when the cover holder 7 is attached to the chamber body 2. In other embodiments, the removable cover 11 may include at least one vent that enables fumes to escape through the lid assembly 6 when the removable cover 11 is attached into the cover holder 7.

Further, the present invention may further comprise a chamber handle 12 to facilitate the safe handling of the infusion chamber 1, especially when the chamber body 2 is hot. As can be seen in FIGS. 1 through 10, the chamber handle 12 is an elongated structure designed to conform to the shape of the user's hand to accommodate the user's hand while grabbing the chamber handle 12. In addition, the cover holder 7 may further include means to aid with the removal of the lid assembly 6 from the chamber opening 5. The cover holder 7 may further comprise a thumb tab 10 that facilitates the removal of the lid assembly 6 from the chamber opening 5. The thumb tab 10 also helps to secure the lid assembly 6 to the chamber handle 12 during the infusion process. Further, the chamber handle 12 comprises a first handle end 13 and a second handle end 14 due to the elongated shape of the chamber handle 12. The chamber handle 12 is preferably attached at one end to the chamber body 2 while the other end is free. This enables the user to easily grab onto the chamber handle 12 to maneuver the chamber body 2 without directly touching the chamber body 2. Accordingly, the first handle end 13 is positioned adjacent to the chamber opening 5. The first handle end 13 is also externally mounted onto the chamber lateral wall 4 to secure the chamber handle 12 to the chamber body 2. On the other hand, the second handle end 14 is positioned adjacent to the chamber base 3 without being connected to the chamber body 2. However, in some embodiments, the second handle end 14 can be connected to the chamber body 2. Furthermore, the thumb tab 10 is peripherally connected to the holder flange 9 so that the user can pull on the holder flange 9 using the thumb tab 10. Finally, the thumb tab 10 is removably connected to the first handle end 13 when the user mounts the lid assembly 6 onto the chamber opening 5. Then, to remove the lid assembly 6, the user pulls on the thumb tab 10 to release the thumb tab 10 from the first handle end 13 and then the user can remove the lid assembly 6 from the chamber opening 5.

Further, to help the user to securely handle the chamber body 2, the chamber handle 12 may further comprise a thumb rest 15 and an anti-slip feature 16. As can be seen in FIGS. 1 through 10, the thumb rest 15 and the anti-slip feature 16 enables the user to safely hold the chamber body 2, especially when the infused product and the chamber body 2 are still hot after the infusion process. To do so, the thumb rest 15 is positioned adjacent to the first handle end 13. The thumb rest 15 is also integrated into the chamber handle 12, opposite to the chamber lateral wall 4. This way, the thumb rest 15 increases the comfort of holding the chamber handle 12 and reduces thumb slippage while pouring out hot substances. The silicone surface of the thumb rest 15 combined with the curvature of the thumb rest 15 allows for more control while pouring. Furthermore, the anti-slip feature 16 is positioned adjacent to the second handle end 14. The anti-slip feature 16 is also integrated into the chamber handle 12, adjacent to the chamber lateral wall 4. This way, when the user grabs the chamber handle 12, the user's fingers comfortably and securely rest on the anti-slip feature 16. The anti-slip feature 16 can be a round protrusion with a plurality of small protrusions such as rings or ridges that prevent the user from losing grip when holding the chamber handle 12.

Figure 11:
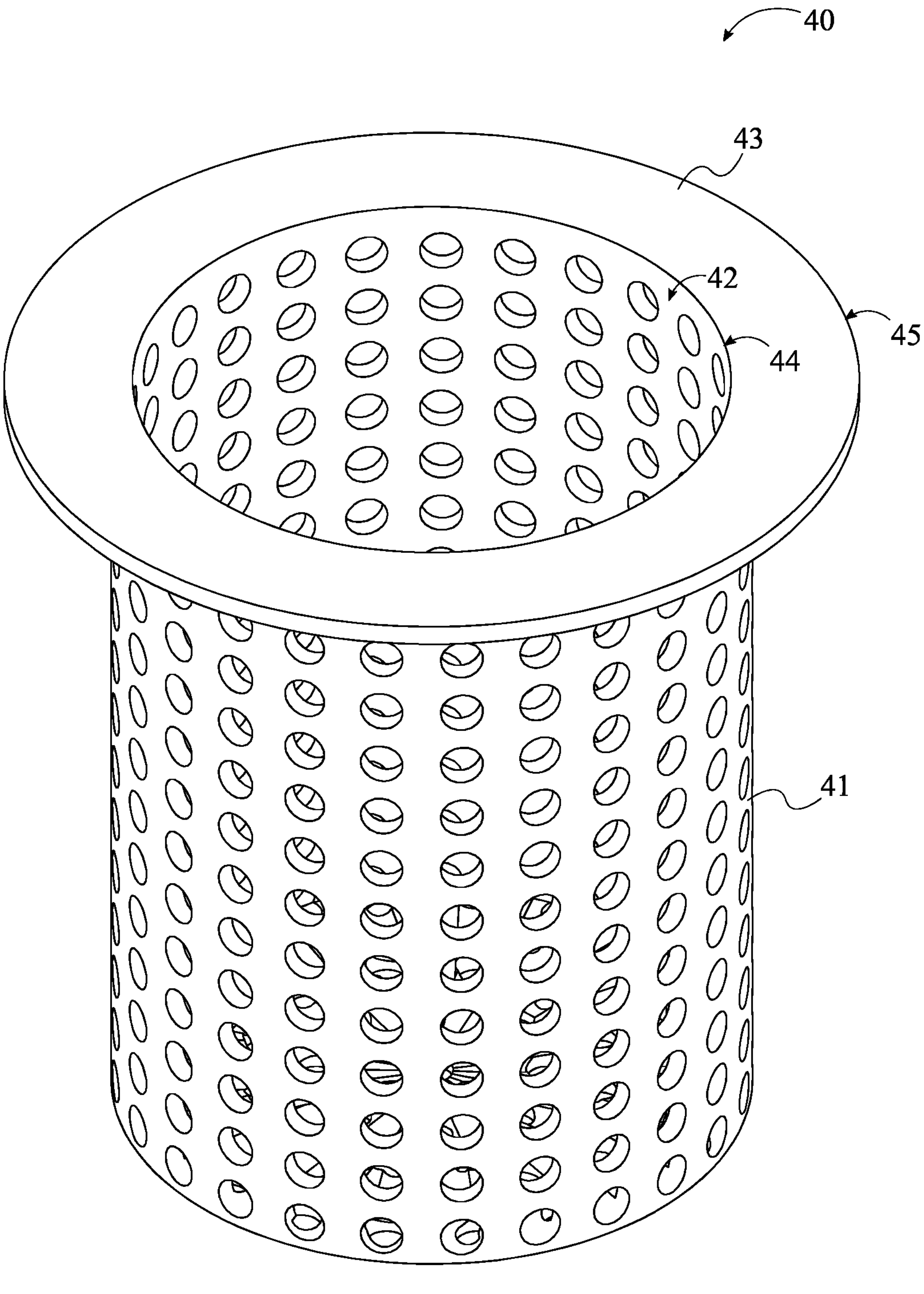
FIG. 11 is a top-front perspective view of a mesh strainer of the plurality of lid accessories of the present invention.
Figure 12:
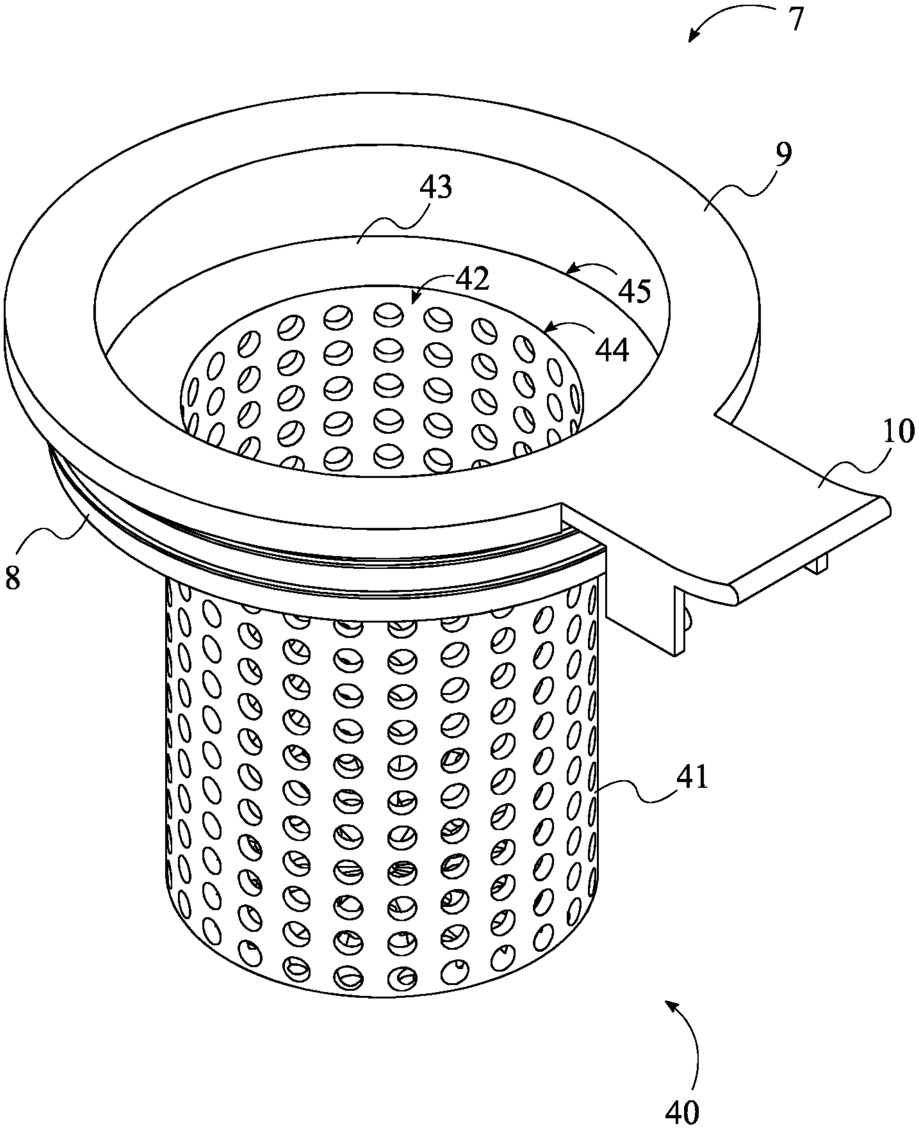
FIG. 12 is a top-front perspective view of the mesh strainer of the present invention, wherein the mesh strainer is shown attached into the cover holder of the lid assembly.

As previously discussed, the cover holder 7 enables the positioning of some of the plurality of lid accessories 52 inside the chamber body 2. In some embodiments, the present invention can include means to remove undesired infusion materials from the final infused product. As can be seen in FIGS. 11 and 12, the plurality of lid accessories 52 may further comprise a mesh strainer 40. The mesh strainer 40 is designed to enable the user to remove unwanted infusion materials from the infused product after the infusion process. For example, the mesh strainer 40 can be used to separate the herbs and other similar ingredients from the oil. To do so, the mesh strainer 40 comprises a mesh receptacle 41 and a mesh ring 43. The mesh receptacle 41 preferably corresponds to the mesh body of the mesh strainer 40 while the mesh ring 43 corresponds to the structure that secures the mesh receptacle 41 to the cover holder 7. Further, the mesh ring 43 comprises an inner ring edge 44 and an outer ring edge 45 corresponding to the edges of the mesh ring 43. The inner ring edge 44 is connected around a receptacle opening 42 of the mesh receptacle 41 to form an overall T-shaped structure. Further, the mesh receptacle 41 is positioned into the chamber body 2 while the mesh ring 43 is attached onto the holder rim 8. This way, the user can hold onto the cover holder 7 while pouring the infused product into the mesh strainer 40 to remove the unwanted infusion materials from the infusion product.

Figure 13:
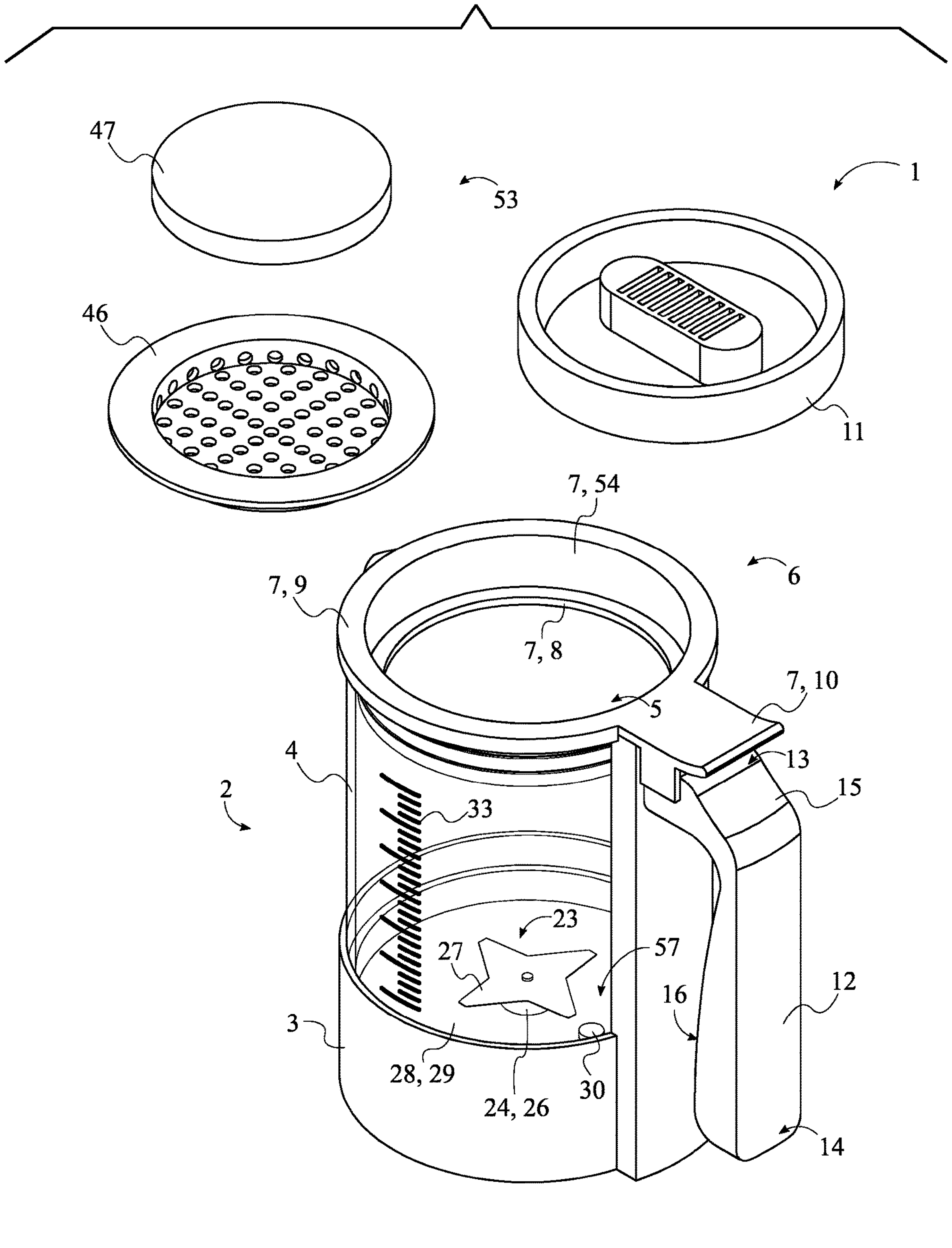
FIG. 13 is a top-front exploded perspective view of a first embodiment of the odor control assembly of the present invention.
Figure 14:
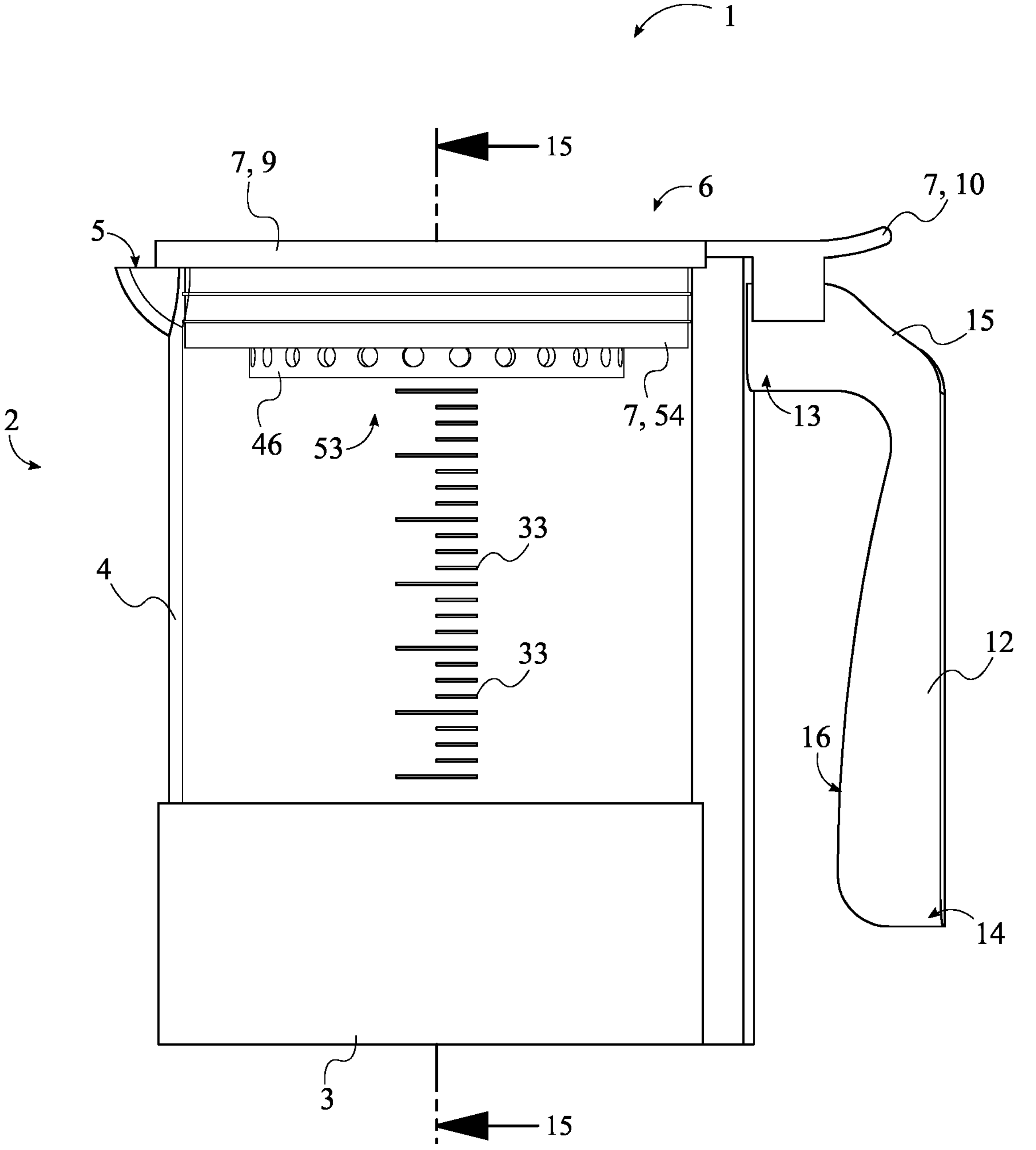
FIG. 14 is a front view of the infusion chamber of the present invention, wherein the infusion chamber is shown with the first embodiment of the odor control assembly.
Figure 15:
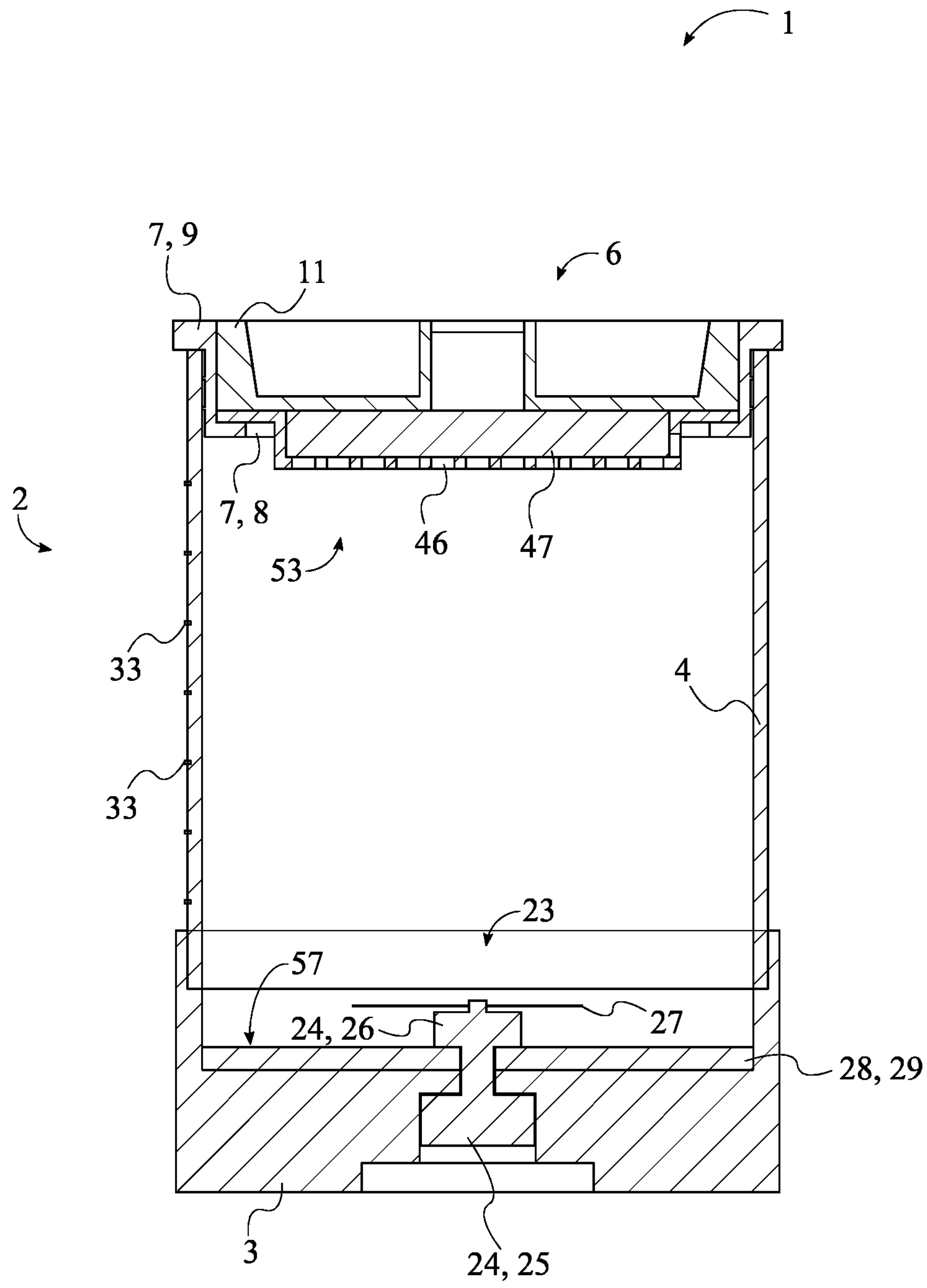
FIG. 15 is a vertical cross-sectional view taken along line 15-15 in FIG. 14.
Figure 16:
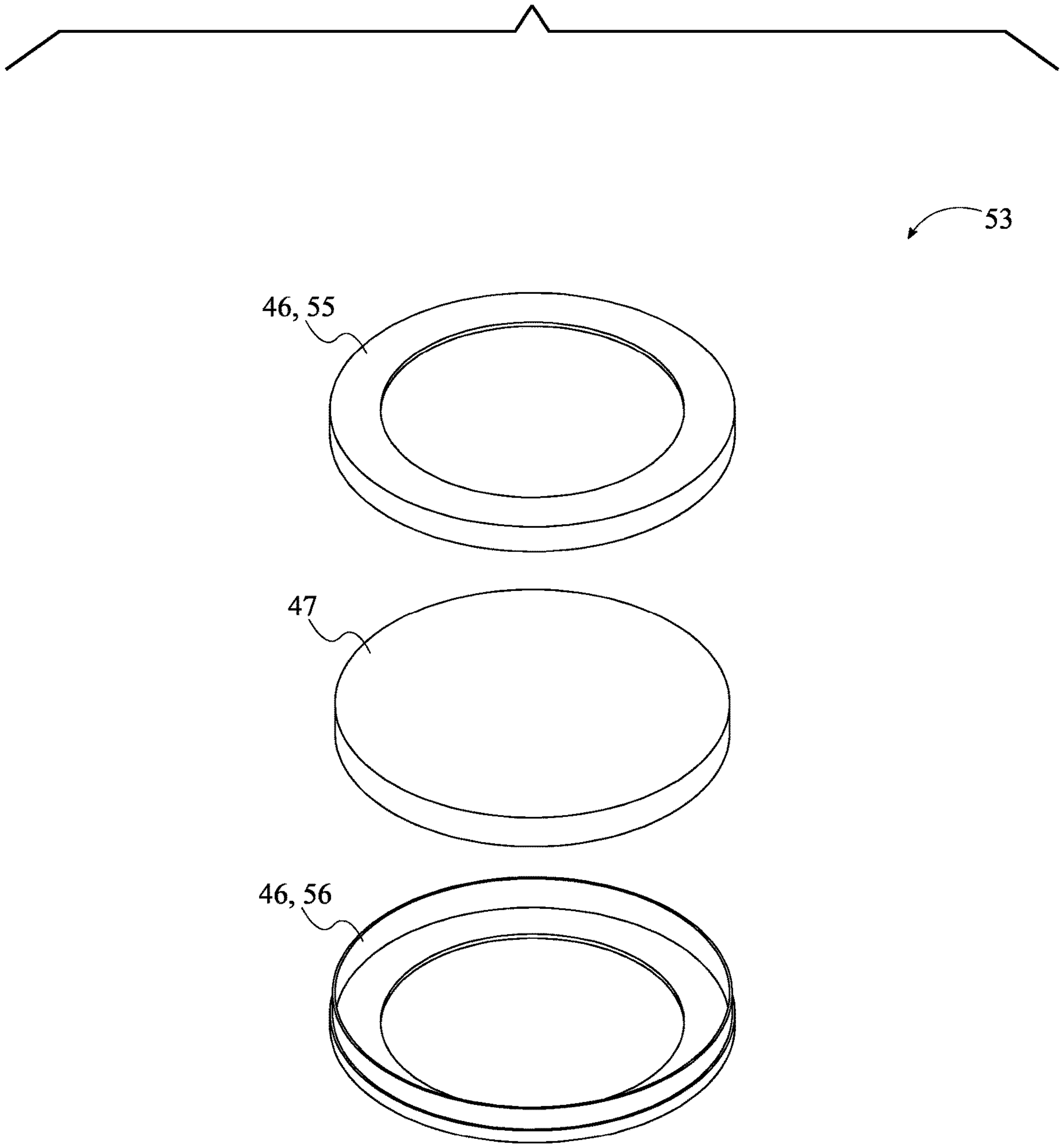
FIG. 16 is a top-front exploded perspective view of a second embodiment of the odor control assembly of the present invention.
Figure 17:
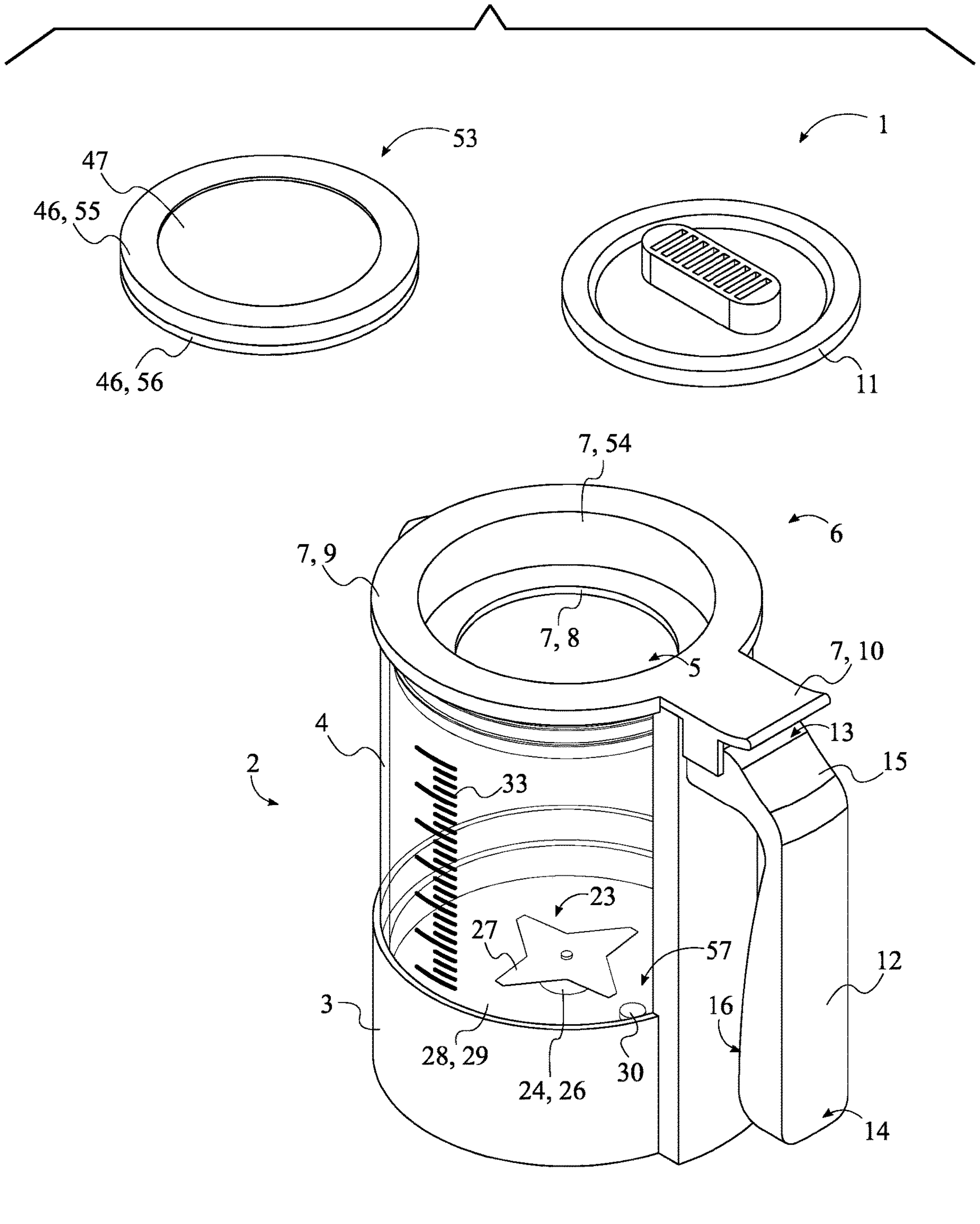
FIG. 17 is a top-front exploded perspective view of the infusion chamber of the present invention, wherein the infusion chamber is shown with the second embodiment of the odor control assembly.
Figure 18:
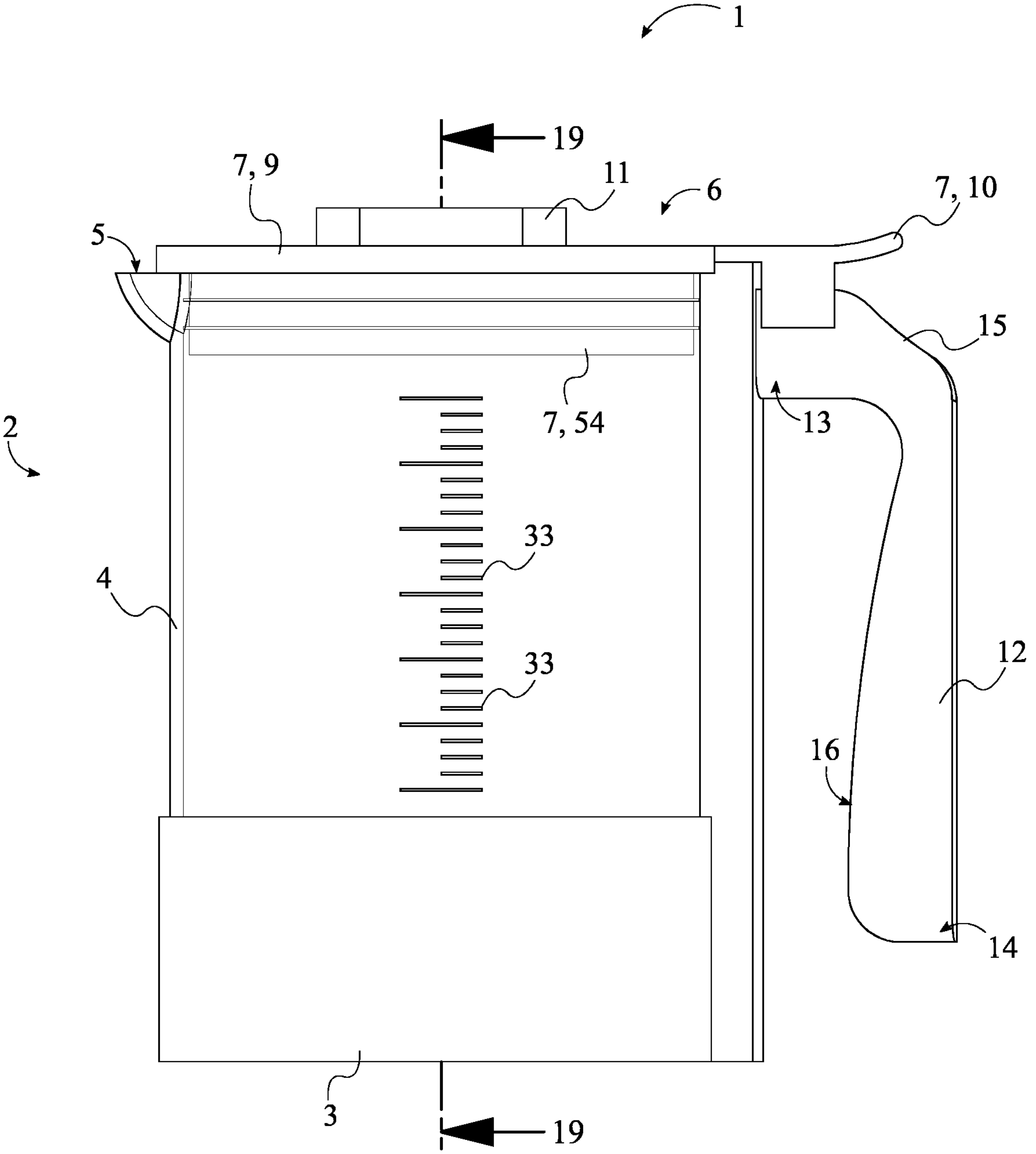
FIG. 18 is a front view of the infusion chamber of the present invention, wherein the infusion chamber is shown with the second embodiment of the odor control assembly.
Figure 19:
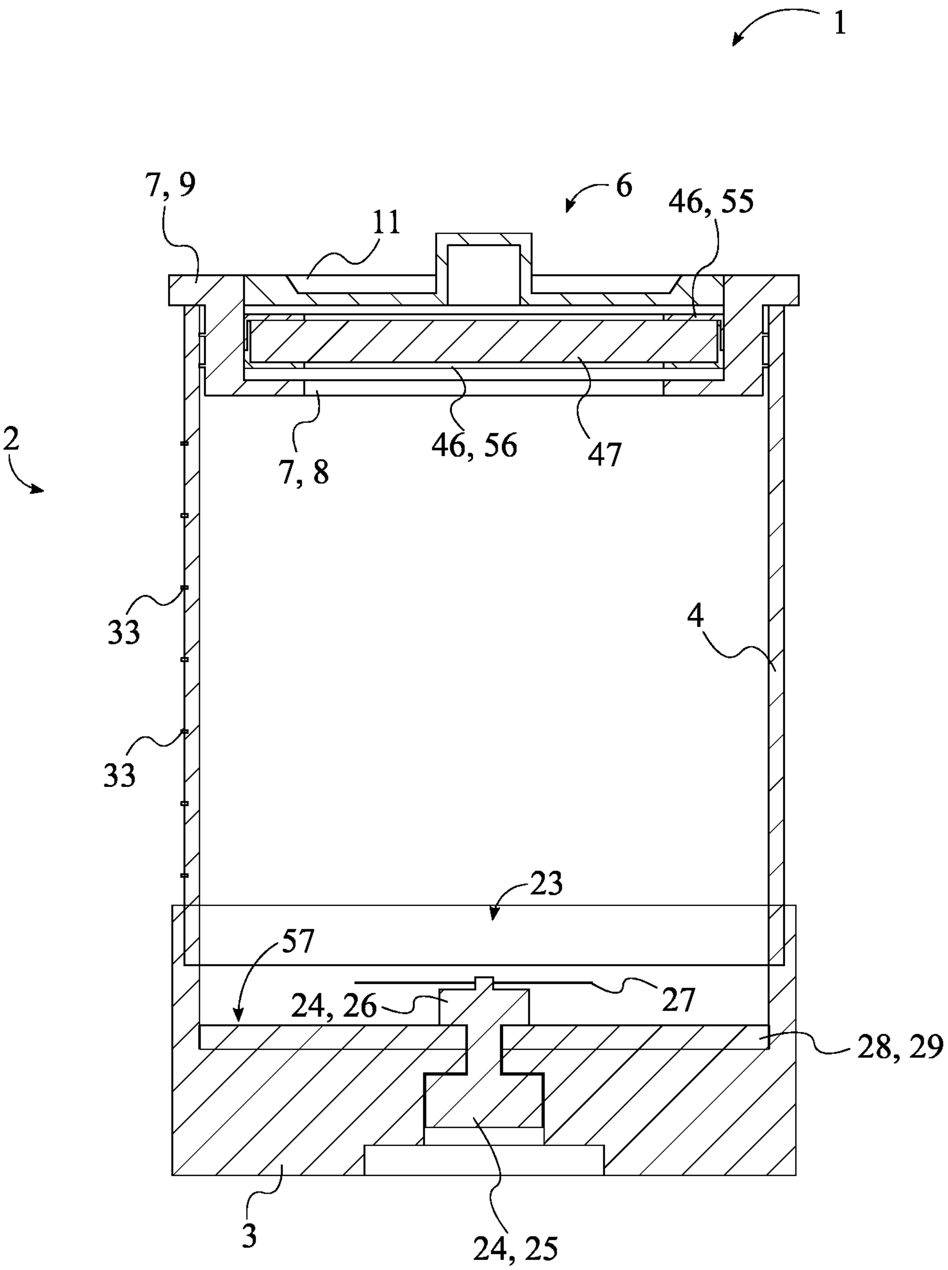
FIG. 19 is a vertical cross-sectional view taken along line 19-19 in FIG. 18.

Further, the odor controlling assembly 53 is preferably designed to be easily maintained. As can be seen in FIGS. 13 through 15, a first embodiment of the odor controlling assembly 53 may comprise a cartridge holder 46 that holds an odor control cartridge 47. The odor control cartridge 47 helps reduce the different odors produced during the infusion and decarboxylation process to keep the surroundings odor-free. To do so, the cartridge holder 46 is attached into the annular insert 54 to secure the cartridge holder 46 to the cover holder 7. The odor control cartridge 47 is positioned within the cartridge holder 46 to maintain the odor control cartridge 47 in the cover holder 7. Finally, the removable cover 11 can be positioned across the cartridge holder 46 to seal the cover holder 7. This way, when the user starts the infusion process, the odor control cartridge 47 traps the odors generated. The filtered odors are then allowed to escape the chamber body 2 through the removable cover 11 to reduce the bad smells associated with the decarboxylation and infusion process. For example, the odor control cartridge 47 reduces the aromatic hydrocarbons of the decarboxylation and infusion process while allowing proper ventilation of the chamber body 2. Further, the odor control cartridge 47 is preferably an activated-carbon filter that efficiently traps most odors generated during the infusion process. In other embodiments, the cartridge holder 46 may be positioned external to the chamber body 2 to hold the odor control cartridge 47 outside the chamber body 2. Further, different fastening mechanisms can be used to secure the cartridge holder 46 to the cover holder 7 including, but not limited to, fasteners, integrated fastening members, etc.

In some embodiments, the cartridge holder 46 can be designed as a modular structure that can be assembled and disassembled to replace the odor control cartridge 47. As can be seen in FIGS. 16 through 19, a second embodiment of the cartridge holder 46 may comprise an annular retainer 55 and an annular base 56. The annular retainer 55 and the annular base 56 are preferably two matching pieces that together form a cage-like structure that holds the odor control cartridge 47. To assemble the cartridge holder 46, the annular retainer 55, the annular base 56, and the odor control cartridge 47 are centrally positioned with each other to form an axially symmetric assembly. The odor control cartridge 47 is then enclosed in between the annular retainer 55 and the annular base 56 to form a single, short, cylindrical assembly. Further, to attach the cartridge holder 46 to the cover holder 7, the annular base 56 is situated onto the holder rim 8. This way, the odor control cartridge 47 is securely held in place in the cover holder 7 to trap any odors generated inside the chamber body 2. In other embodiments, the cartridge holder 46 may be designed as a single structure that receives the odor control cartridge 47.

Figure 20:
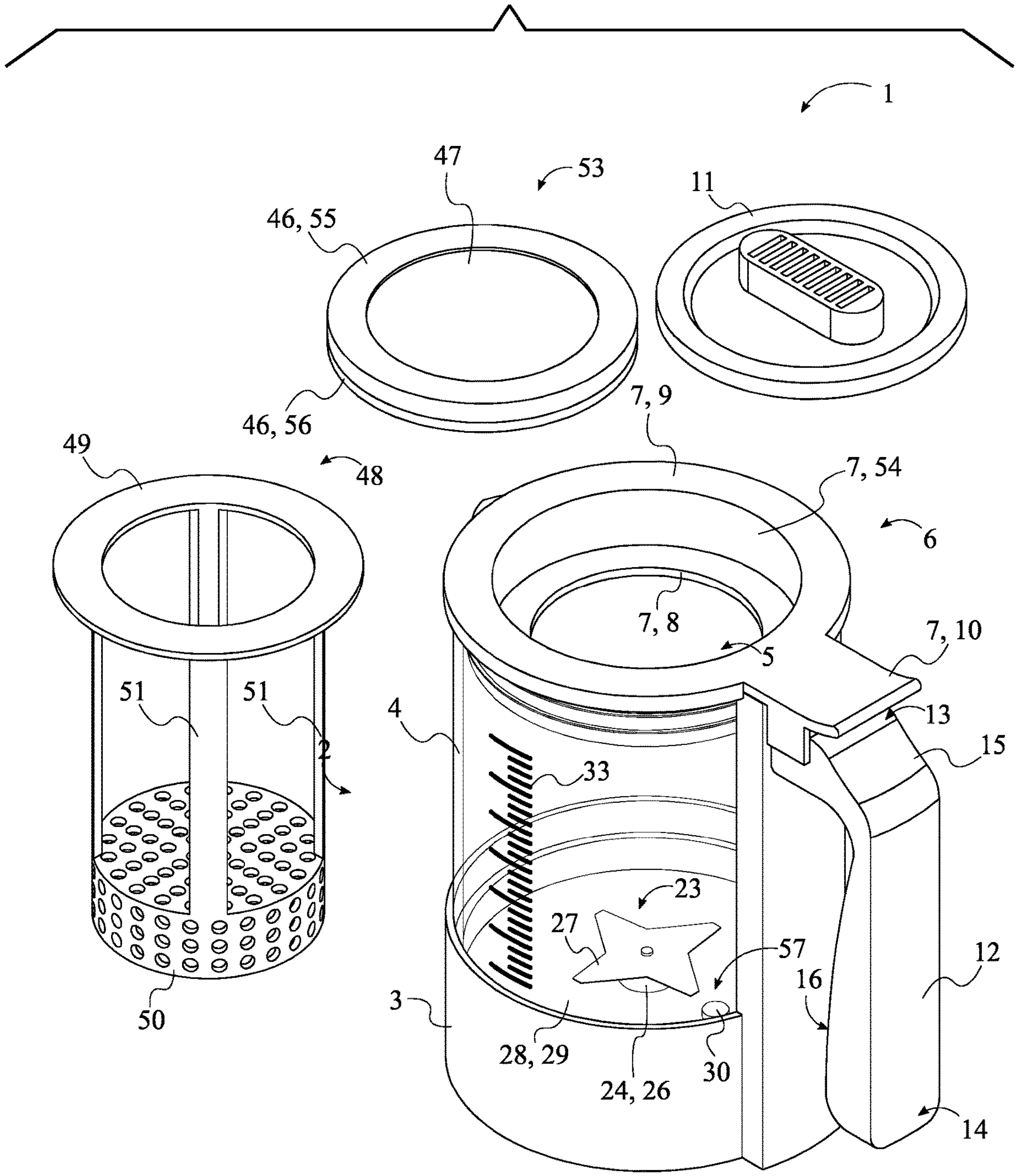
FIG. 20 is a top-front exploded perspective view of the infusion chamber of the present invention, wherein the infusion chamber is shown with a blade reduction screen and the second embodiment of the odor control assembly.
Figure 21:
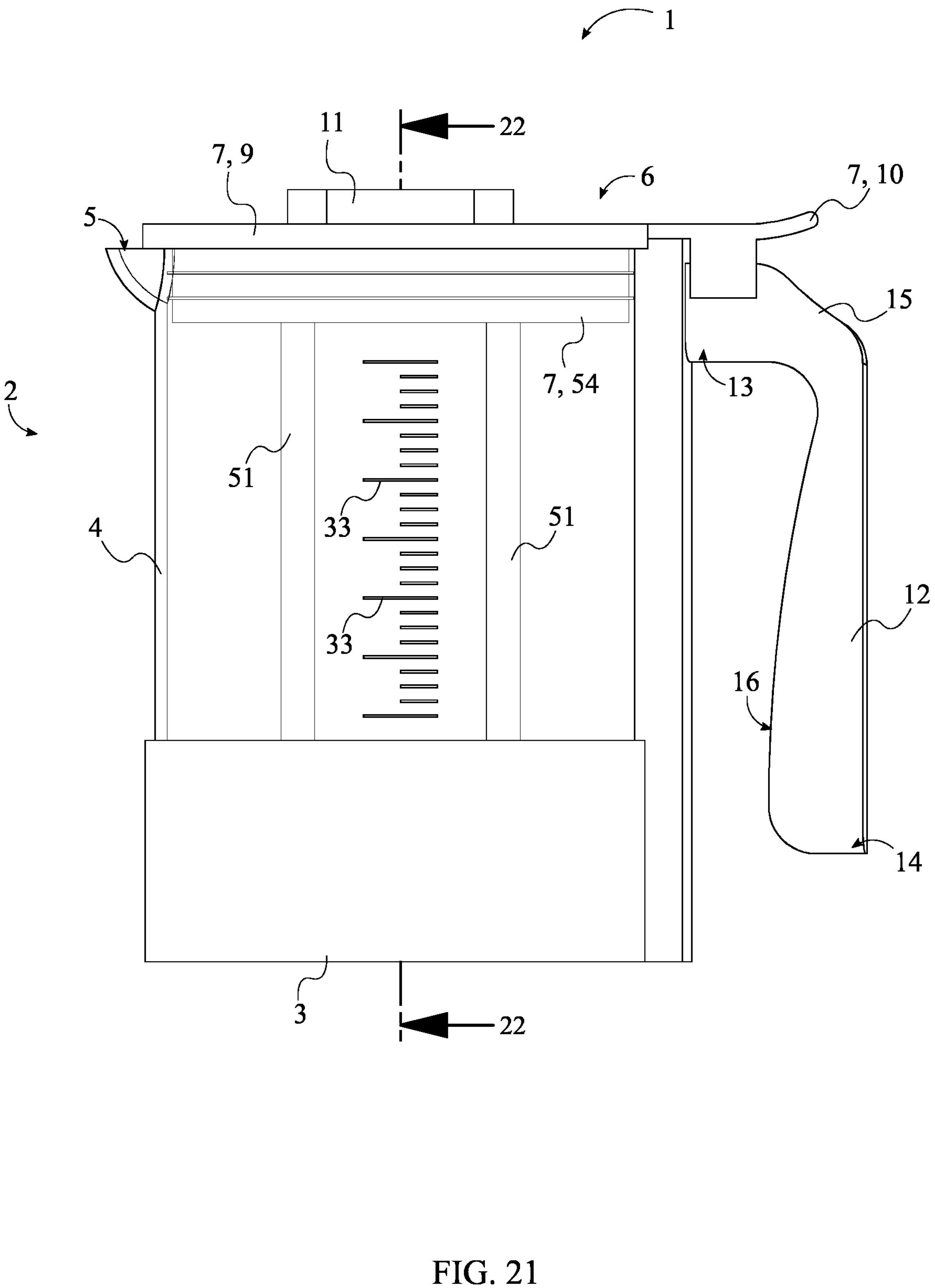
FIG. 21 is a front view of the infusion chamber of the present invention, wherein the infusion chamber is shown with the blade reduction screen and the second embodiment of the odor control assembly.
Figure 22:
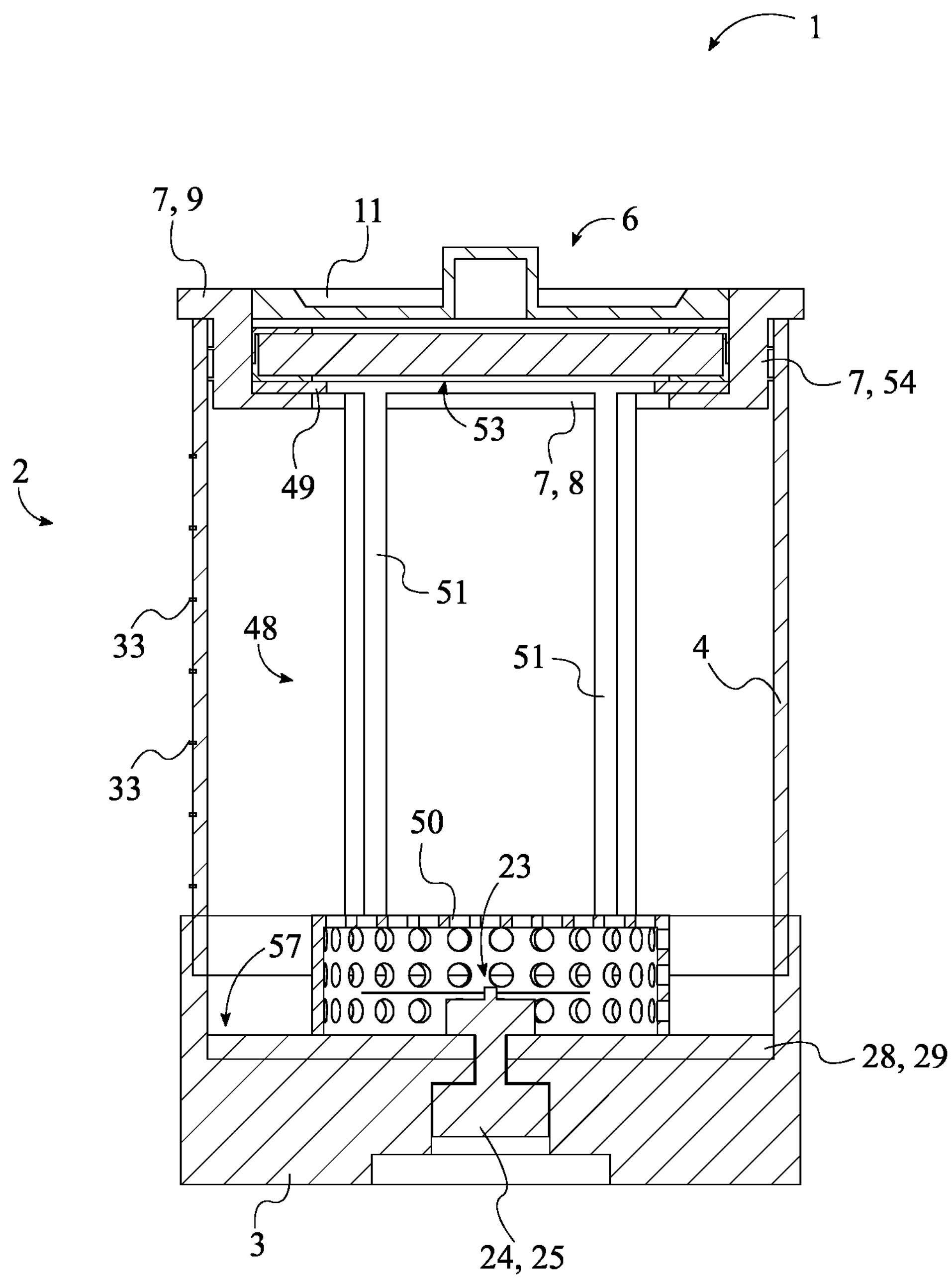
FIG. 22 is a vertical cross-sectional view taken along line 22-22 in FIG. 21.
Figure 23:
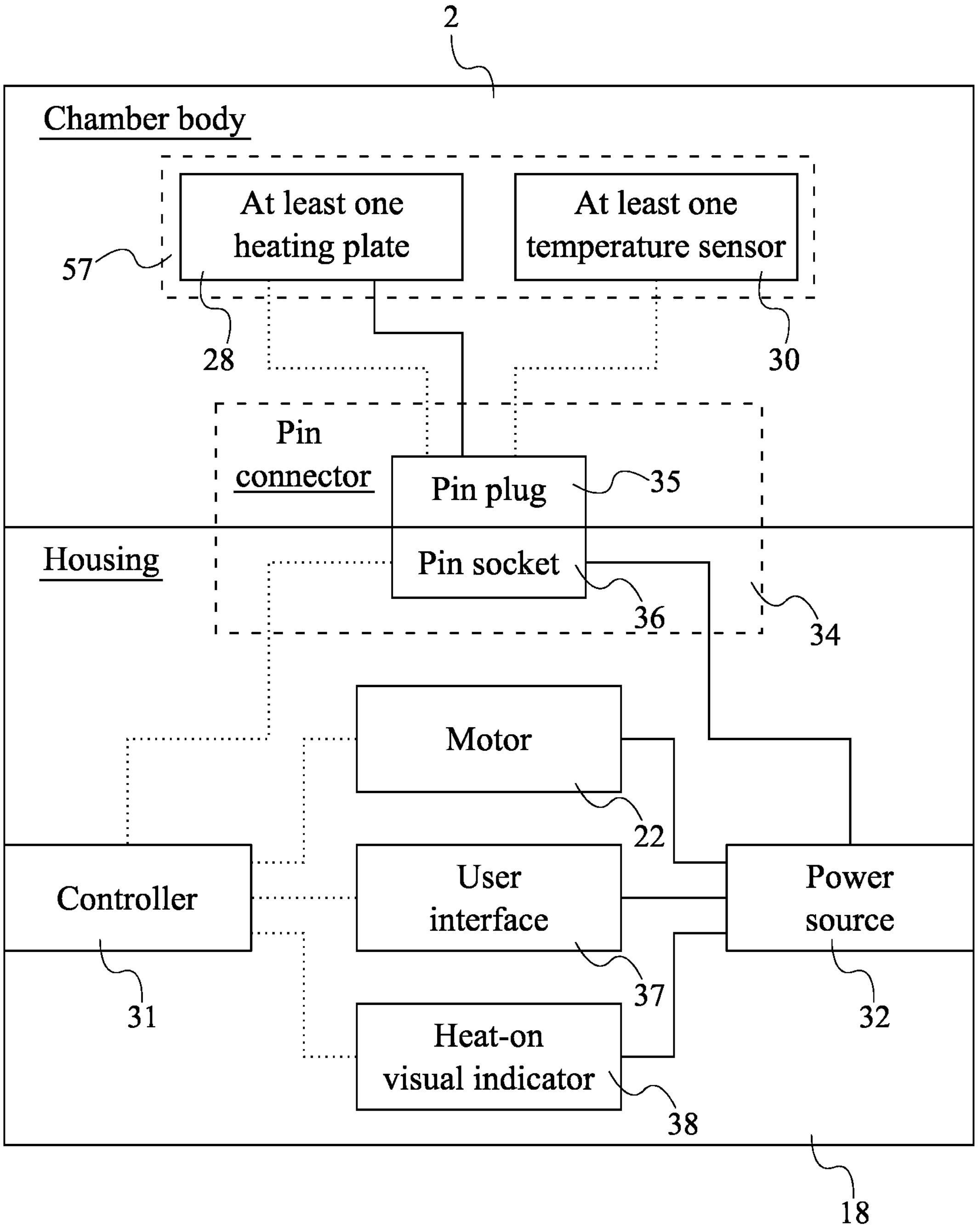
FIG. 23 is a schematic view of the electrical connections and the electronic connections of the present invention, wherein the electrical connections are shown in solid lines, and wherein the electronic connections are shown in dotted lines.

As can be seen in FIGS. 20 through 22, the plurality of lid accessories 52 may further comprise a blade reduction screen 48. The blade reduction screen 48 enables the infusion process of solid and liquid infusion materials without fully blending the solid infusion materials with the liquid infusion materials. For example, the blade reduction screen 48 prevents the blending of herbs while enabling oils or other liquids to be circulated throughout the entire chamber due to the centripetal acceleration of the at least one blade 27. To do so, the blade reduction screen 48 comprises a ring mount 49, a blade screen 50, and a plurality of screen rods 51. The ring mount 49 enables the attachment of the blade reduction screen 48 to the cover holder 7. The plurality of screen rods 51 positions the blade screen 50 around the at least one blade 27 to reduce the amount of solid infusion materials being blended with the liquid infusion materials. The blade screen 50 can be made from perforated materials such as mesh materials that enable the flow of liquids through the blade screen 50. Further, the blade screen 50 can be provided with different mesh hole sizes to accommodate different herbal to oil ratios. For example, the blade screen 50 can include mesh holes with size of one millimeter (mm) to produce extremely clean infusions. On the other hand, a blade screen 50 with mesh holes of size mm can make infusions that are greener.

As can be seen in FIGS. 20 through 22, the plurality of screen rods 51 is radially distributed about the blade screen 50 to evenly position the blade screen 50 around the at least one blade 27. The ring mount 49 is similarly positioned around the blade screen 50 to ensure that the blade screen 50 is positioned around the at least one blade 27. Further, the blade screen 50 is terminally connected to each of the plurality of screen rods 51 to secure the blade screen 50 to the plurality of screen rods 51. Similarly, the ring mount 49 is terminally connected to each of the plurality of screen rods 51, opposite to the blade screen 50, to secure the ring mount 49 to the plurality of screen rods 51. Furthermore, the ring mount 49 is attached onto the holder rim 8 to secure the blade reduction screen 48 to the cover holder 7. This way, when the user closes the chamber opening 5 with the cover holder 7, the blade screen 50 is positioned around the at least one blade 27 and securely kept in position during the infusion process. Together with the at least one blade 27, the blade reduction screen 48 enables the present invention to make infusions of different consistencies. When the blade reduction screen 48 is used, the blade reduction screen 48 blocks the herbal materials from touching the at least one blade 27. Thus, the user can make thick blends with heavy textures by just using the at least one blade 27 or remove the heavy taste and green texture of the infused products by utilizing blade reduction screen 48 during the infusion process.

Although the invention has been explained in relation to its preferred embodiment, it is to be understood that many other possible modifications and variations can be made without departing from the spirit and scope of the invention.

What is claimed is:

1. An herbal infusion and decarboxylation device comprising:

an infusion chamber;

an infusion mechanism;

a controller;

a power source;
a plurality of lid accessories;
the infusion chamber comprising a chamber body and a lid assembly;
the plurality of lid accessories comprising an odor controlling assembly;
the infusion mechanism comprising a housing, a heating mechanism, and a mixing mechanism;
the chamber body comprising a chamber base, a chamber lateral wall, and a chamber opening;
the lid assembly comprising a cover holder and a removable cover;
the cover holder comprising an annular insert, a holder rim, and a holder flange;
the chamber body being mounted onto the housing;
the lid assembly being mounted onto the chamber body, opposite to the housing;
at least one selected accessory from the plurality of lid accessories being operatively integrated into the lid assembly, wherein the at least one selected accessory is used to provide a supplemental functionality to the lid assembly;
the mixing mechanism being operatively integrated into the chamber body, wherein the mixing mechanism is used to blend contents of the chamber body;
the heating mechanism being in thermal communication with the chamber body;
the mixing mechanism and the heating mechanism being electronically connected to the controller;
the mixing mechanism, the heating mechanism, and the controller being electrically connected to the power source;
the chamber base being positioned opposite to the chamber opening about the chamber lateral wall;
the annular insert, the holder rim, the holder flange, and the removable cover being centrally positioned with each other;
the holder rim and the holder flange being positioned opposite to each other along the annular insert;
the holder rim and the holder flange being connected perpendicularly to the annular insert;
the annular insert being hermetically attached into the chamber opening; and
the removable cover being hermetically attached onto the holder flange.

2. The herbal infusion and decarboxylation device as claimed in claim 1 comprising:
the chamber base being positioned coextensive with the housing; and
the chamber base being mounted onto the housing.

3. The herbal infusion and decarboxylation device as claimed in claim 2 comprising:
the mixing mechanism comprising a blade hub, at least one blade, and a motor;
the heating mechanism comprising at least one heating plate and at least one temperature sensor;
the blade hub comprising a first hub end and a second hub end;
the blade hub centrally traversing through the chamber base and the at least one heating plate;
the first hub end being rotatably connected to the chamber base;
the second hub end being rotatably connected to the at least one heating plate;
the at least one temperature sensor being in thermal communication with the chamber body;
the motor and the controller being mounted within the housing;
the motor being operatively coupled to the first hub end, wherein the motor is used to rotationally drive the first hub end;
the at least one blade being torsionally connected to the second hub end;
the motor, the at least one heating plate, and the at least one temperature sensor being electronically connected to the controller; and
the motor and the at least one heating plate being electrically connected to the power source.

4. The herbal infusion and decarboxylation device as claimed in claim 3 comprising:
the at least one heating plate comprising an annular plate body;
the annular plate body being positioned coextensive with the chamber base;
the annular plate body being mounted onto the chamber base; and
the blade hub being centrally positioned with the annular plate body.

5. The herbal infusion and decarboxylation device as claimed in claim 3, wherein the at least one blade is a low emulsion pitched blade.

6. The herbal infusion and decarboxylation device as claimed in claim 2 comprising:
a plurality of markings;
the plurality of markings being distributed along the chamber lateral wall; and
the plurality of markings being inscribed onto the chamber lateral wall.

7. The herbal infusion and decarboxylation device as claimed in claim 2, wherein the chamber lateral wall is made of a transparent material.

8. The herbal infusion and decarboxylation device as claimed in claim 1 comprising:
a pin connector;
the pin connector comprising a pin plug and a pin socket;
the pin plug being integrated into the chamber body, adjacent to the housing;
the pin socket being integrated into the housing, adjacent to the pin plug;
the heating mechanism being electrically connected to the power source through the pin connector; and
the heating mechanism being electronically connected to the controller through the pin connector.

9. The herbal infusion and decarboxylation device as claimed in claim 1 comprising:
the housing comprising a first housing base, a second housing base, and a housing lateral wall;
the first housing base being positioned opposite to the second housing base about the housing lateral wall; and
the chamber body being centrally mounted onto the first housing base.

10. The herbal infusion and decarboxylation device as claimed in claim 9 comprising:
a user interface;
the user interface being integrated into the housing lateral wall;
the user interface being electronically connected to the controller; and
the user interface being electrically connected to the power source.

11. The herbal infusion and decarboxylation device as claimed in claim 9 comprising:
a heat-on visual indicator;

the heat-on visual indicator being positioned around the housing lateral wall;
the heat-on visual indicator being positioned adjacent to the second housing base;
the heat-on visual indicator being integrated into the housing lateral wall;
the heat-on visual indicator being electronically connected to the controller; and
the heat-on visual indicator being electrically connected to the power source.

12. The herbal infusion and decarboxylation device as claimed in claim 9 comprising:
a plurality of legs;
the plurality of legs being distributed across the second housing base; and
the plurality of legs being mounted onto the second housing base, opposite the housing lateral wall.

13. The herbal infusion and decarboxylation device as claimed in claim 1 comprising:
a chamber handle;
the cover holder further comprising a thumb tab;
the chamber handle comprising a first handle end and a second handle end;
the first handle end being positioned adjacent to the chamber opening;
the first handle end being externally mounted onto the chamber lateral wall;
the second handle end being positioned adjacent to the chamber base;
the thumb tab being peripherally connected to the holder flange; and
the thumb tab being removably connected to the first handle end.

14. The herbal infusion and decarboxylation device as claimed in claim 13 comprising:
the chamber handle further comprising a thumb rest and an anti-slip feature;
the thumb rest being positioned adjacent to the first handle end;
the thumb rest being integrated into the chamber handle, opposite to the chamber lateral wall;
the anti-slip feature being positioned adjacent to the second handle end; and
the anti-slip feature being integrated into the chamber handle, adjacent to the chamber lateral wall.

15. The herbal infusion and decarboxylation device as claimed in claim 1 comprising:
the plurality of lid accessories further comprising a mesh strainer;
the mesh strainer comprising a mesh receptacle and a mesh ring;
the mesh ring comprising an inner ring edge and an outer ring edge;
the inner ring edge being connected around a receptacle opening of the mesh receptacle;
the mesh receptacle being positioned into the chamber body; and
the mesh ring being attached onto the holder flange.

16. The herbal infusion and decarboxylation device as claimed in claim 1 comprising:
the odor controlling assembly comprising a cartridge holder and an odor control cartridge;
the cartridge holder being attached into the annular insert;
the odor control cartridge being positioned within the cartridge holder; and
the removable cover being positioned across the cartridge holder.

17. The herbal infusion and decarboxylation device as claimed in claim 16 comprising:
the cartridge holder comprising an annular retainer and an annular base;
the annular retainer, the annular base, and the odor control cartridge being centrally positioned with each other;
the odor control cartridge being enclosed in between the annular retainer and the annular base; and
the annular base being situated onto the holder rim.

18. The herbal infusion and decarboxylation device as claimed in claim 16, wherein the odor control cartridge is an activated-carbon filter.

19. The herbal infusion and decarboxylation device as claimed in claim 1 comprising:
the plurality of lid accessories further comprising a blade reduction screen;
the blade reduction screen comprising a ring mount, a blade screen, and a plurality of screen rods;
the plurality of screen rods being radially distributed about the blade screen;
the ring mount being positioned around the blade screen;
the blade screen being terminally connected to each of the plurality of screen rods;
the ring mount being terminally connected to each of the plurality of screen rods, opposite to the blade screen; and
the ring mount being attached onto the holder rim.

* * * * *